United States Patent
Ikeuchi et al.

(10) Patent No.: US 6,549,847 B2
(45) Date of Patent: Apr. 15, 2003

(54) NAVIGATION APPARATUS

(75) Inventors: Tomoya Ikeuchi, Tokyo (JP);
Masaharu Umezu, Tokyo (JP);
Makoto Mikuriya, Tokyo (JP); Mitsuo Shimotani, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/995,743

(22) Filed: Nov. 29, 2001

(65) Prior Publication Data

US 2002/0082773 A1 Jun. 27, 2002

(30) Foreign Application Priority Data

Dec. 21, 2000 (JP) ........................................ 2000-388273

(51) Int. Cl.$^7$ ................................................ G06F 7/00
(52) U.S. Cl. ....................................... 701/208; 701/211
(58) Field of Search ................................. 701/200, 206, 701/207, 208, 210, 211

(56) References Cited

U.S. PATENT DOCUMENTS 6,263,343 B1 * 7/2001 Hirono ........................ 701/210

FOREIGN PATENT DOCUMENTS

JP        A1 11-6739        1/1999

* cited by examiner

*Primary Examiner*—William A. Cuchlinski, Jr.
*Assistant Examiner*—Edward Pipala
(74) *Attorney, Agent, or Firm*—Leydig, Voit & Mayer, Ltd.

(57) ABSTRACT

A navigation apparatus includes a map database that records map data in a fixed storage medium, a map data read section for reading map data from the map database, and a navigation section for detecting the location of local apparatus, calculating a route to a destination specified by the user, and giving guidance to the destination according to the route, a map information acquisition section for acquiring map information from outside the navigation apparatus, and a map information update section for updating the map database with the map information acquired by the map information acquisition section. The navigation section includes an emphasis display section that displays updated data detected in a difference data detecting section, in an emphasized way, and an emphasis voice guidance section that emphasizes the data detected in the difference data detecting section.

13 Claims, 30 Drawing Sheets

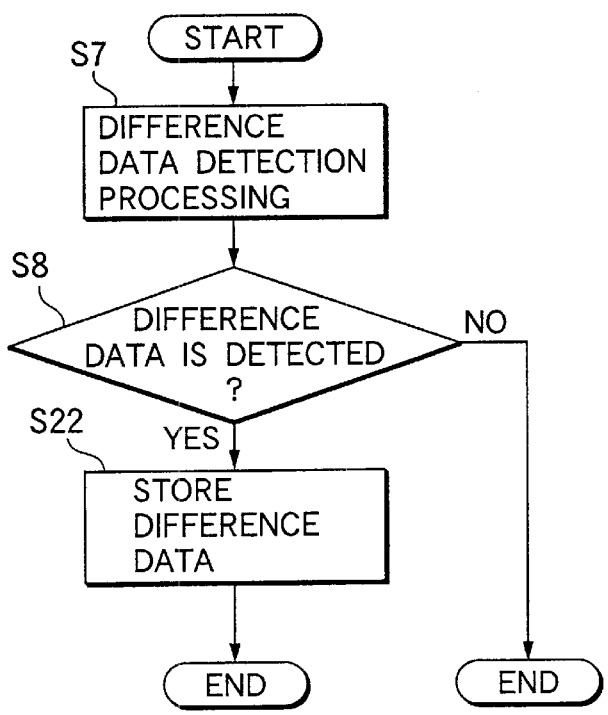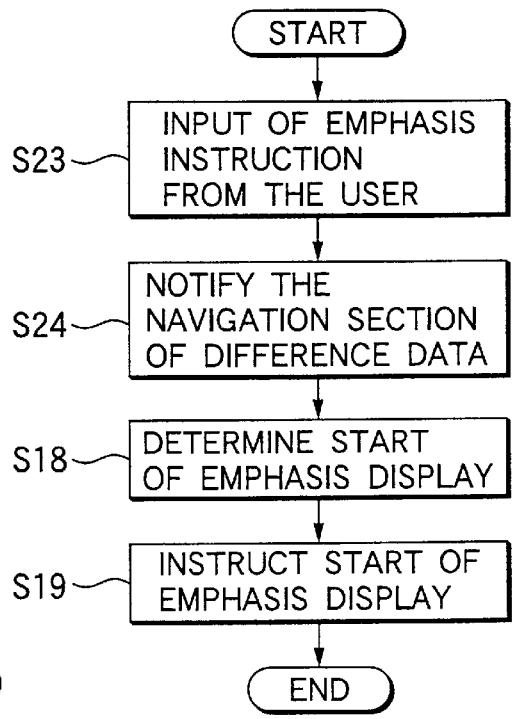

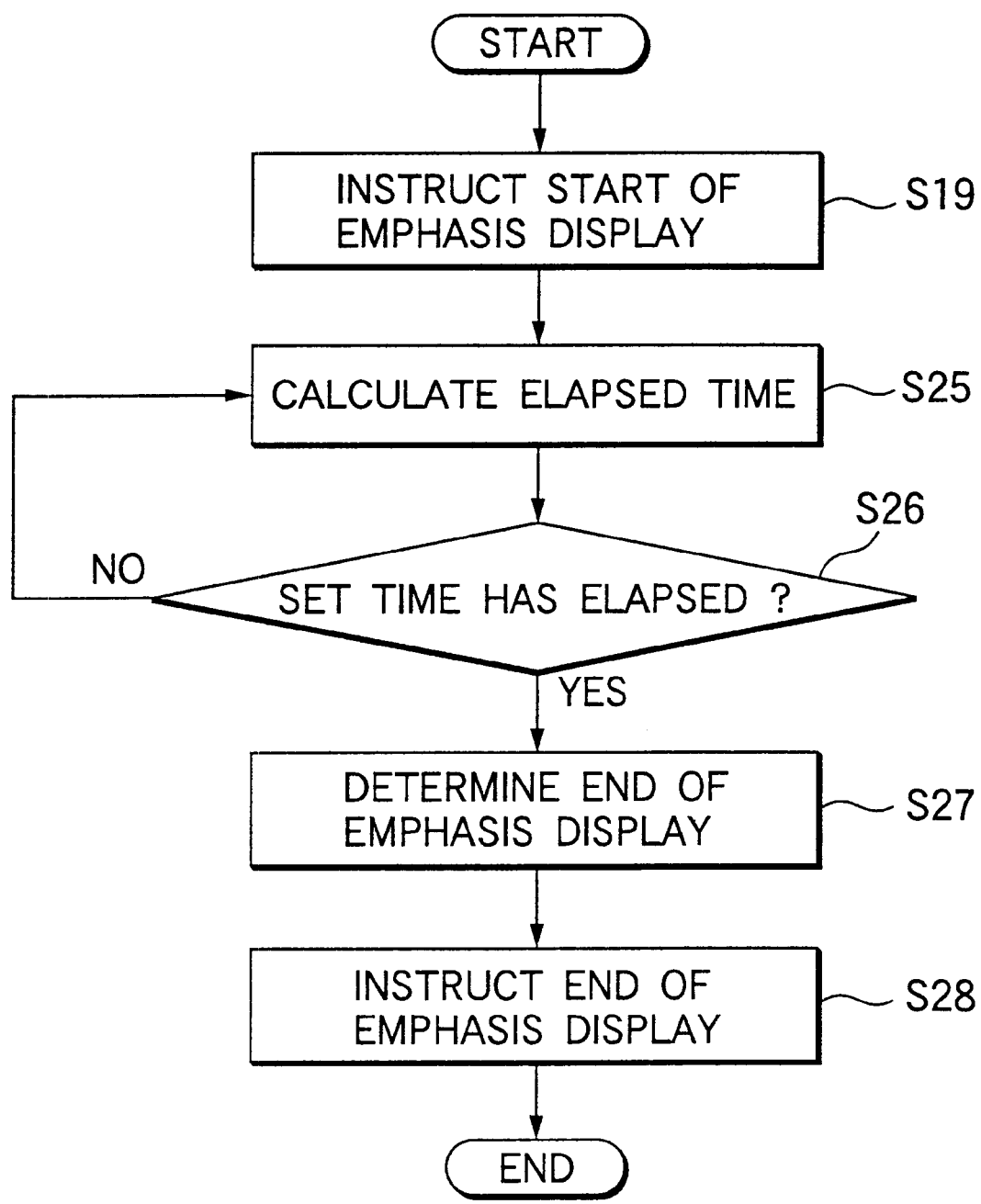

NAVIGATION APPARATUS

BACKGROUND OF THE INVENTION

1. Field of the Invention

The present invention relates to a navigation apparatus for indicating map information to let the user reach his/her destination in a comfortable way.

2. Description of the Related Art

FIG. 34 is a block diagram showing a related art navigation apparatus shown for example in the Japanese Patent Laid-Open No. Hei.-11-6739. In the figure, a numeral 300 represents a basic map information storage medium for storing basic map information, 10 a navigation section for performing navigation referring to map information including basic map information, 11 a gyro sensor for detecting the location of local apparatus, 12 a display for displaying map information, 400 an additional information storage medium for storing difference information used to form the latest map data, 20 a synthesizer for synthesizing map information stored in the basic map information storage medium 300 and additional information stored in the additional information storage medium 400, 100 a GPS satellite for originating a GPS signal used to detect, in cooperation with the gyro sensor, the location of the local apparatus, and 200 a sending station for originating traffic jam information.

Next, the operation of the navigation apparatus will be described. It is possible to detect the location of the local apparatus via the GPS satellite 100 or gyro sensor 11. Next, the navigation section 10 synthesizes map information stored in the basic map information storage medium 300 and additional information stored in the additional information storage medium 400 in the synthesizer 20 to use the latest map information. The latest map information thus obtained is displayed on the display 12. Then, the navigation section 10 performs navigation while considering traffic jam information transmitted by the sending station 200. While additional information is stored in the additional information storage medium 400, it may be acquired for example via a communication path.

Since the related art navigation apparatus synthesizes basic map information and additional information to perform navigation using the same display as that of ordinary map information, it is difficult for the user to recognize modified information and the information on the display is not appropriate for making a proper judgment.

SUMMARY OF THE INVENTION

The invention is intended to solve such problems, and an object of the invention is to readily transmit updated information obtained by updating map information with difference information to the user so that the user may always make judgement that is based on map information.

Navigation apparatus according to the first aspect of the invention is a navigation apparatus comprising a map database that records map data in a fixed storage medium, a map data read section for reading map data from the map database, and a navigation section for detecting the location of local apparatus, calculating a proper route to a destination specified by the user, and giving guidance to the destination according to the route, characterized in that the navigation apparatus comprises a map information acquisition section for acquiring map information from outside the navigation apparatus and a map information update section for updating the map database with the map information acquired by the map information acquisition section, that the navigation section comprises an emphasis display section for displaying the data detected in a difference data detecting section in an emphasized way and an emphasis voice guidance section for giving emphasis guidance of the data detected in the difference data detecting section, and that the map information update section comprises a difference data detecting section for detecting modified data from the map data read by the map data read section in the map information acquired by the map information acquisition section and a map information merging section for merging map data read by the map data read section and map information acquired by the map information acquisition section to generate updated map data.

A navigation apparatus according to the second aspect of the invention is characterized in that the map information acquisition section comprises an acquirable information presenting section for presenting map information to the user that can be acquired from outside and a target information selecting section for the user to select target map information from the acquirable map information presented to the user.

A navigation apparatus according to the third aspect of the invention is characterized in that the map information acquisition section comprises a target information specification section for the user to specify target map information to be acquired from outside.

A navigation apparatus according to the fourth aspect of the invention is characterized in that the map information acquisition section comprises a target information unspecification section for canceling user specification to limit target information on the geographical area necessary for a route search and maintaining the unspecification when information on the geographical area where specification is canceled is subsequently acquired.

A navigation apparatus according to the fifth aspect of the invention comprises an emphasis management section for performing emphasis display and emphasis voice guidance, characterized in that the emphasis management section comprises an emphasis start determination section for determining the timing of starting emphasis display or emphasis voice guidance, an emphasis display end determination section for determining the timing of ending emphasis display, and an emphasis display level determination section for determining the emphasis level of each item to be displayed emphatically.

A navigation apparatus according to the sixth aspect of the invention comprises an emphasis management section for managing the emphasis method, characterized in that the emphasis management section comprises an emphasis unit determination section for determining to emphasize emphasis unit information that stores the types of items preselected by the user and data corresponding to the emphasis unit information.

A navigation apparatus according to the seventh aspect of the invention comprises an emphasis management section for managing the emphasis method and a map data usage characteristics learning section for learning the map data usage characteristics of the user, characterized in that the emphasis management section comprises an emphasis detail level determination section for determining the detail level of the contents to be displayed emphatically or to undergo emphasis voice guidance in accordance with the map data usage characteristics learned by the map data usage characteristics learning section.

A navigation apparatus according to the eighth aspect of the invention comprises an emphasis management section for managing the emphasis method, characterized in that the emphasis management section comprises a due date information detecting section for detecting due date information in case due date information is included in the difference data detected in the difference data detecting section and a due date emphasis instructing section for instructing due date emphasis to the emphasis display section or an emphasis voice guidance section according to the due date described in the due date information detected by the due date information detecting section.

A navigation apparatus according to the ninth aspect of the invention comprises an emphasis management section for managing the emphasis method, characterized in that the emphasis management section comprises an emphasis characteristics learning section for learning the emphasis characteristics of the user.

A navigation apparatus according to the tenth aspect of the invention is characterized in that the emphasis display section, recognizing an item to be displayed emphatically, emphasizes the item in a way different from the emphasis of the current items displayed emphatically.

A navigation apparatus according to the eleventh aspect of the invention is characterized in that the difference data detecting section comprises a difference area calculating section for calculating the geographical area where difference data is present and that the emphasis display section shows that difference data is present in the lower-layer map data in case the geographical area calculated by the difference area calculating section is contained in the lower layer of the displayed map data.

BRIEF DESCRIPTION OF THE DRAWINGS

FIGS. 15A and 15B are flowcharts explaining the operation of a navigation apparatus according to Fourteenth embodiment of the invention.

FIG. 16 is a flowchart explaining the operation of a navigation apparatus according to Fifteenth embodiment of the invention.

DETAILED DESCRIPTION OF THE PRESENT INVENTION

First Embodiment

Figure 1:
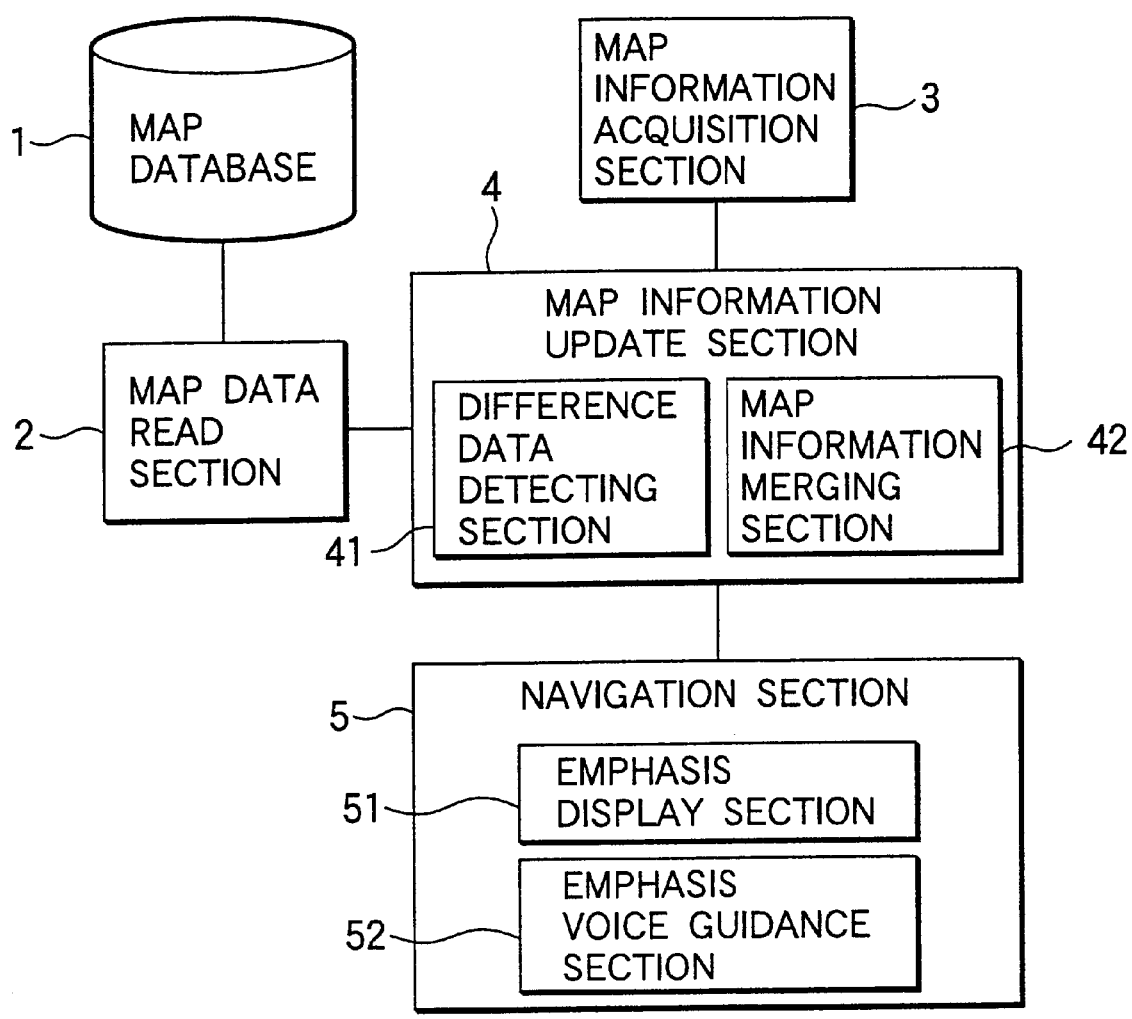
FIG. 1 is a block diagram explaining the configuration of a navigation apparatus according to First embodiment of the invention.

FIG. 1 is a block diagram explaining the configuration of a navigation apparatus according to First embodiment of the invention. In FIG. 1, a numeral 1 represents a map database, 2 a map data read section, 3 a map information acquisition section, 4 a map information update section, 5 a navigation section, 41 a difference data detecting section, 42 a map information merging section, 51 an emphasis display section, and 52 an emphasis voice guidance section.

The map database 1 is map data stored on a fixed storage medium such as a DVD-ROM and a CD-ROM. Map data stored in the map database 1 is read by the map data read section 2. The map information acquisition section 3 acquires the latest map information from outside the navigation apparatus via radio communications such as a portable telephone set. The map information update section 4 synthesizes, in the map merging section 42 the latest map data of a format that can be recognized by the navigation section 5, based on the map data read by the map data read section 2 from the map data read section 2 and the latest map information acquired by the map information acquisition section 3. The navigation section 5 performs navigation such as route calculation and guidance to the destination based on the synthesized latest map data.

In this practice, the difference data detecting section 41 of the map information update section 4 detects difference data between the map data read by the map data read section 2 from the map database 1 and the latest map information acquired by the map information acquisition section 3. The detected difference data is passed to the navigation section 5 and the section corresponding to the difference data is displayed emphatically on the display (not shown), unlike ordinary display method. Or, the difference data is emphasized in a voice guidance by the emphasis voice guidance section, unlike ordinary voice guidance.

In case the difference data is displayed emphatically by the emphasis display section, the emphasis display is made via methods such as a method where a different color from that used for ordinary display is used, a method where the type or thickness of a line is difference from that used in ordinary display, a method where the section corresponding to the difference data is blinking, and a method where the section corresponding to the difference data is represented in character strings.

Figure 30:
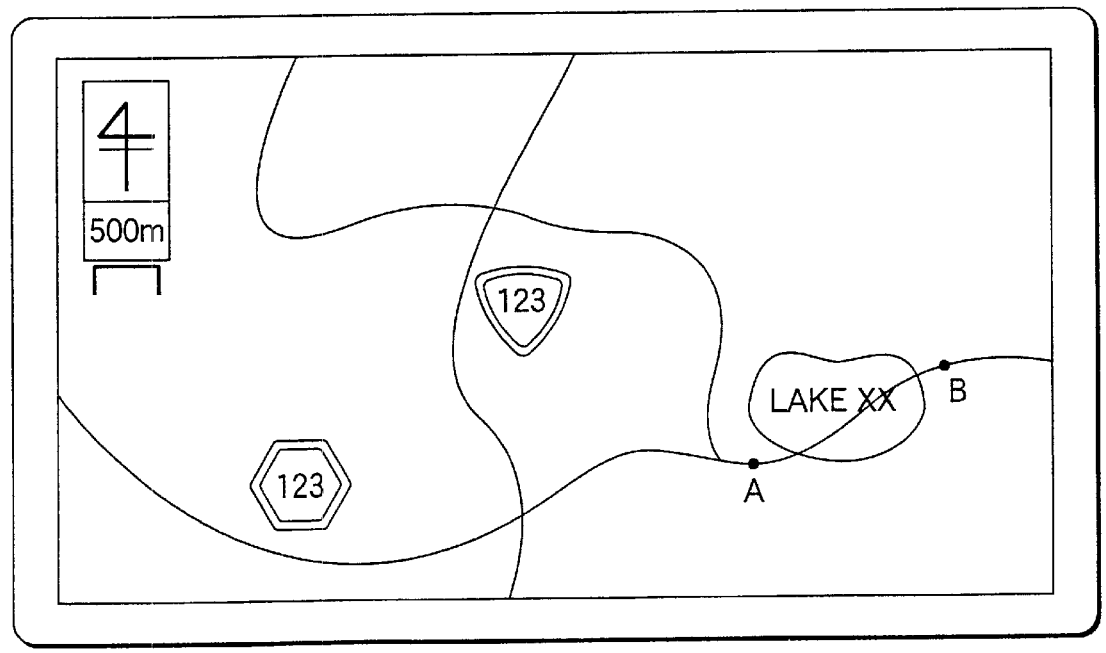
FIG. 30 is a block diagrams explaining a display screen of the navigation apparatus according to First embodiment of the invention.
Figure 31:
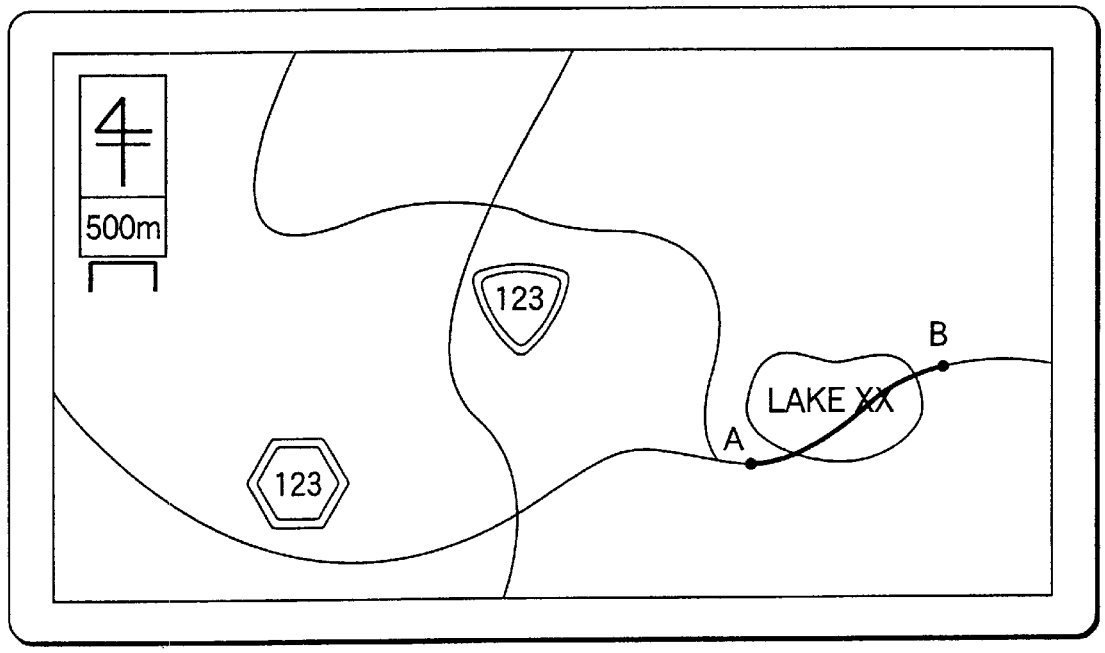
FIG. 31 is a block diagrams explaining a display screen of the navigation apparatus according to First embodiment of the invention.
Figure 32:
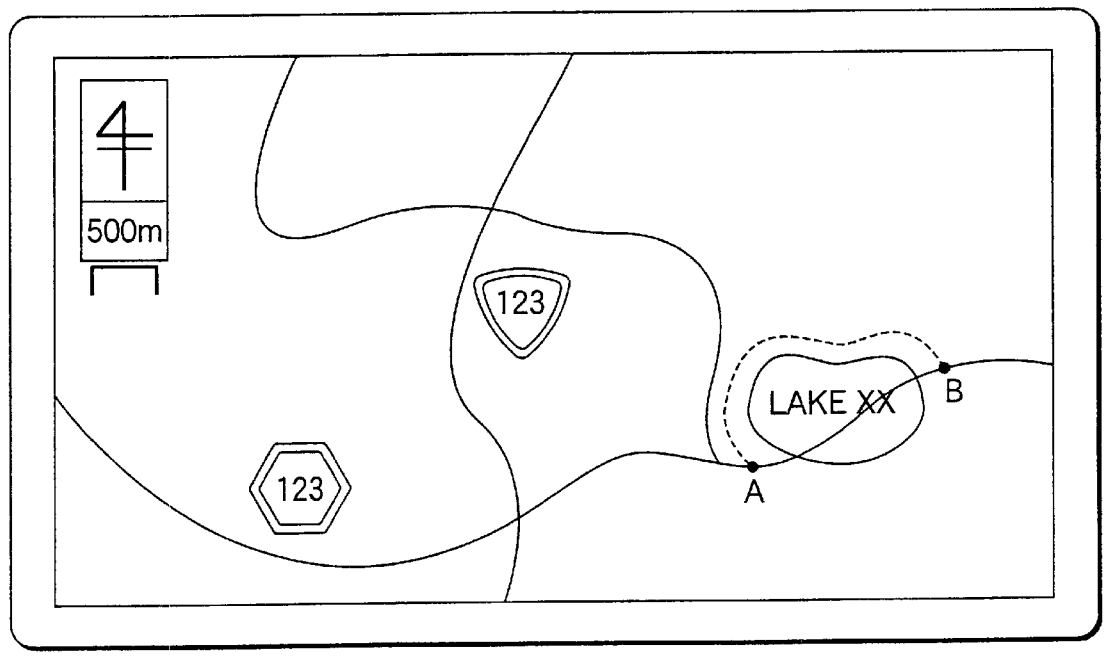
FIG. 32 is a block diagrams explaining a display screen of the navigation apparatus according to First embodiment of the invention.
Figure 33:
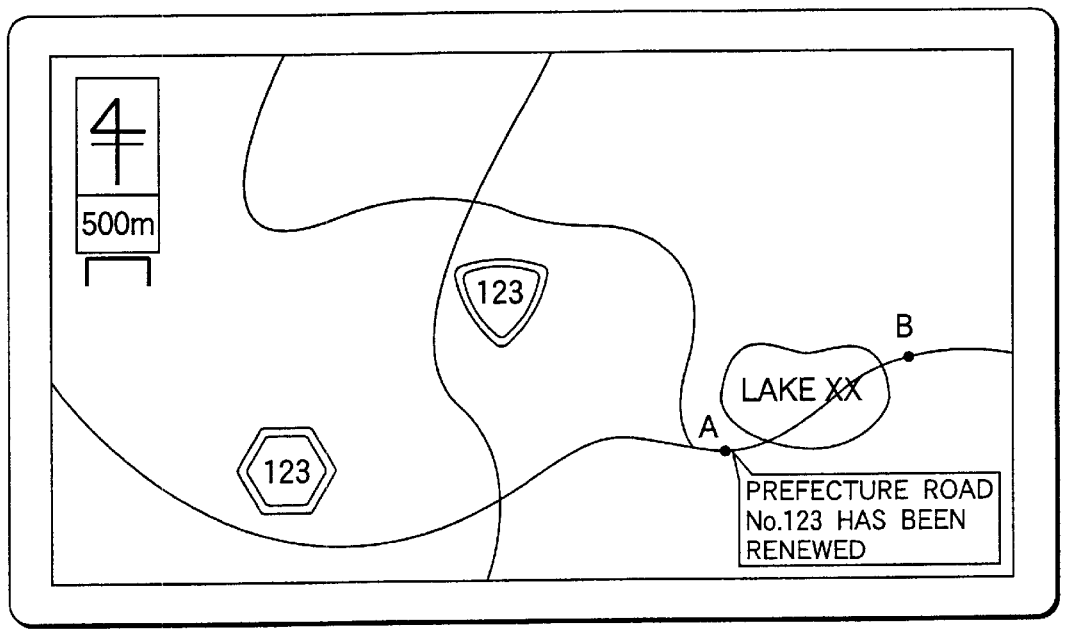
FIG. 33 is a block diagrams explaining a display screen of the navigation apparatus according to First embodiment of the invention.
Figure 34:
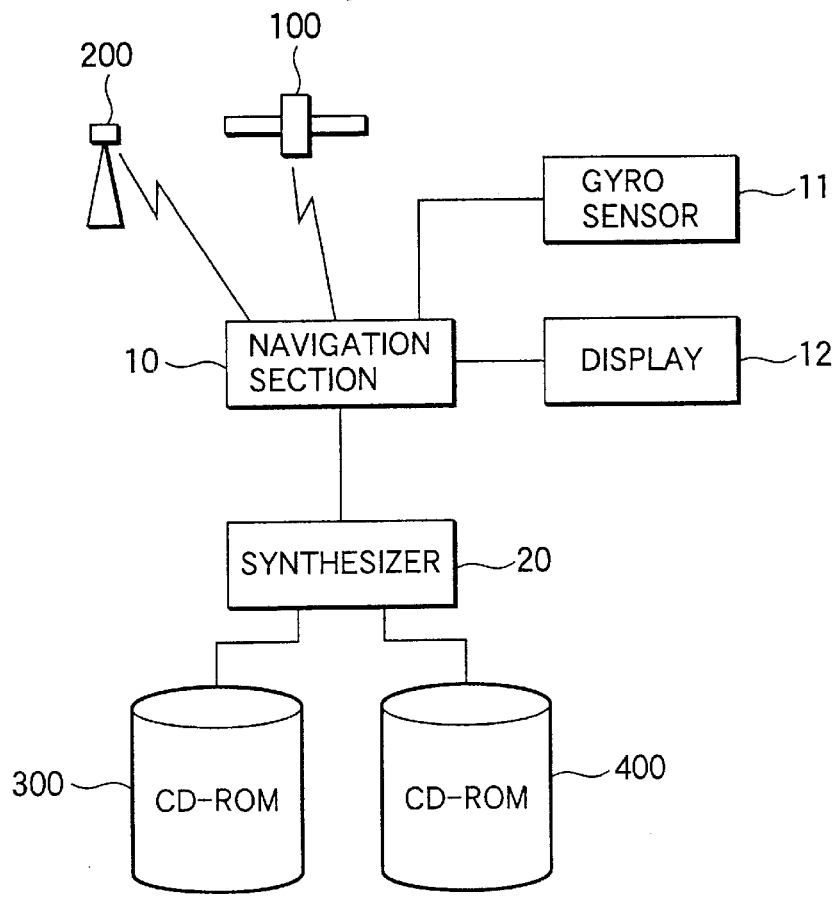
FIG. 34 is a block diagram explaining a related art navigation apparatus.

FIGS. 30 through 33 are block diagrams explaining display screens of navigation apparatus according to First embodiment of the invention. These figures show, in particular, an example where the road section from Point A to Point B in the prefectural road No. 123 that used to lie on the northern coast of the lake is now in direct connection. FIG. 30 is an example where the section from Point A to Point B is emphasized by a different color. FIG. 31 is an example where the section from Point A to Point B is emphasized by a line of a different thickness. FIG. 32 is an example where the new road is emphasized by displaying the former road via a dotted line. FIG. 33 is an example where the section from Point A to Point B is emphasized by representing the section in character strings.

While the map information acquisition section 3 acquires the latest map information from outside the navigation apparatus via radio communications such as a portable telephone set according to First embodiment, the same advantage is obtained by using a fixed storage medium such as a CD-ROM and a DVD-ROM, or a rewritable storage medium such as a hard disk unit and a memory card.

While First embodiment assumes car navigation apparatus used in a vehicle, the same advantage is obtained via a similar configuration of navigation apparatus wherein a portable information terminal, typically a portable telephone set or a PDA retains a amp database in a storage such as a compact hard disk unit in order to acquire the latest map data from outside via communications.

Second Embodiment

Figure 2:
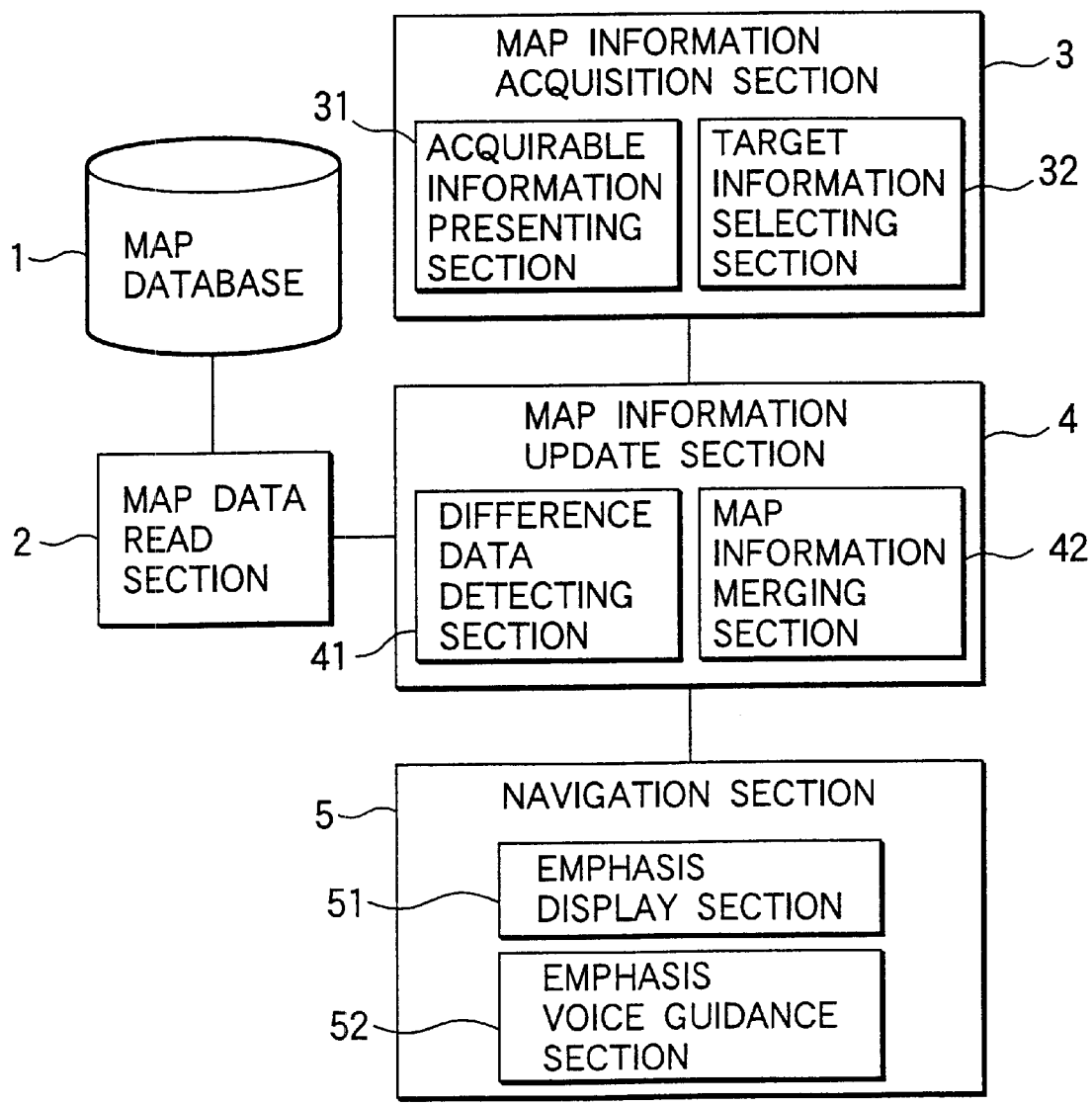
FIG. 2 is a block diagram explaining the configuration of a navigation apparatus according to Second embodiment of the invention.

FIG. 2 is a block diagram explaining the configuration of a navigation apparatus according to Second embodiment of the invention. In the figure, components having the same signs as those in FIG. 1 are identical or equivalent components. In FIG. 2, a numeral 31 represents an acquirable information presenting section and 32 a target information selecting section.

When the map information acquisition section 3 acquires items whose map data contents stored in the map database 1 can be updated, by acquiring map information from outside, the acquirable information presenting section 31 presents items that can be updated to the user. Presentation of items that can be updated to the user includes presentation of a geographical area that can be updated or items that can be updated such as road information that can be updated and facility information that can be updated. The user utilizes the target information selecting section 32 to select information to be updated from the items presented. The map information acquisition section 3 acquires from outside only the map information on the items specified by the user. The subsequent operation is the same as that in First embodiment.

Third Embodiment

Figure 3:
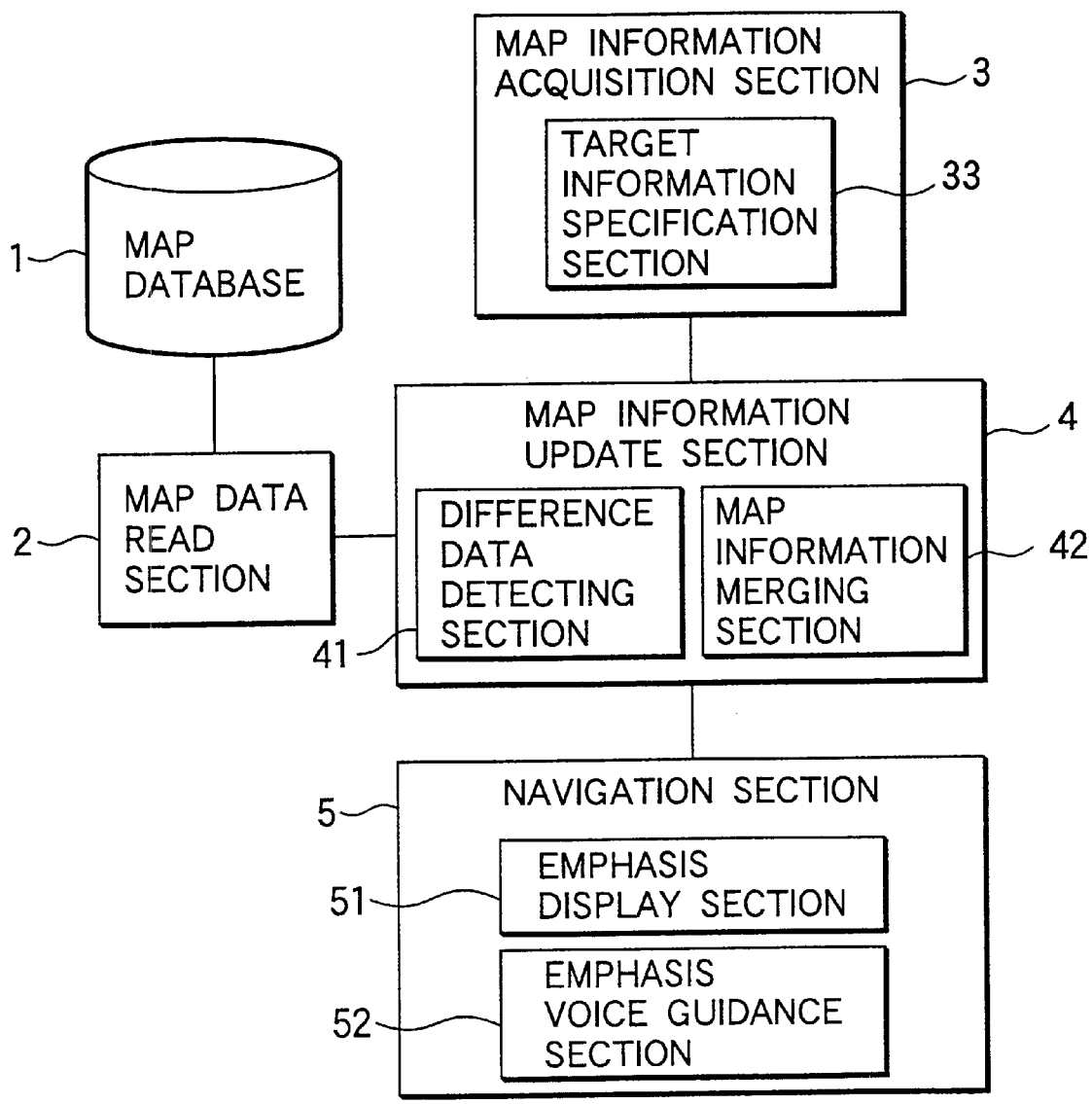
FIG. 3 is a block diagram explaining the configuration of a navigation apparatus according to Third embodiment of the invention.

FIG. 3 is a block diagram explaining the configuration of a navigation apparatus according to Third embodiment of the invention. In the figure, components having the same signs as those in FIG. 1 are identical or equivalent components. In FIG. 3, a numeral 33 represents a target information specification section.

The map information acquisition section 3 acquires map information in accordance with the items specified by the user in advance via the target information specification section 33. The items that the user can specify may be information on the geographical area that can be updated or items that can be updated such as road information that can be updated and facility information that can be updated.

Figure 4:
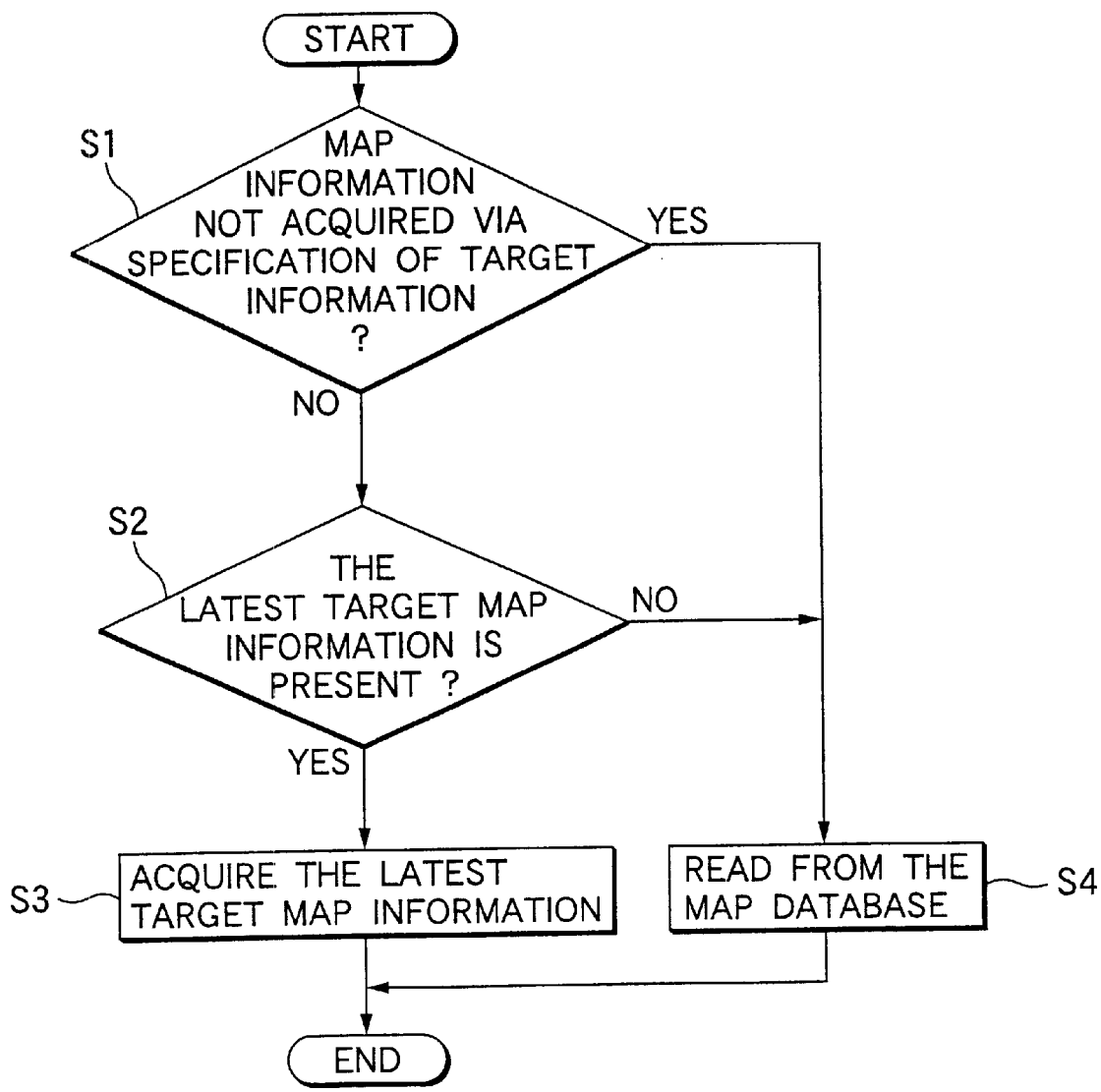
FIG. 4 is a flowchart explaining the operation of the navigation apparatus according to Third embodiment of the invention.

FIG. 4 is a flowchart explaining the operation of navigation apparatus according to Third embodiment of the invention. When acquiring map information from outside in response to a request from the navigation section 5, the map information acquisition section 3 determines whether the requested map information corresponds to map information that is not candidate for acquisition in the user's specification of target information (S1). In case the requested map information corresponds to map information that is not candidate for acquisition, the map information acquisition section 3 uses only the map data read by the map data read section 2 from the map database 1 without acquiring map information from outside (S4). In case the map information acquisition section 3 determines that the requested map information does not correspond to map information that is not candidate for acquisition in S1, the map information acquisition section 3 determines whether the map information corresponding to the requested map information can be acquired (S2). In case the map information acquisition section 3 determines that the corresponding map information is absent, the map information acquisition section 3 performs the processing of S4. In case the corresponding map information is present, the map information acquisition section 3 acquires the map information from outside (S3). The subsequent operation is the same as that in First embodiment.

Fourth Embodiment

Figure 5:
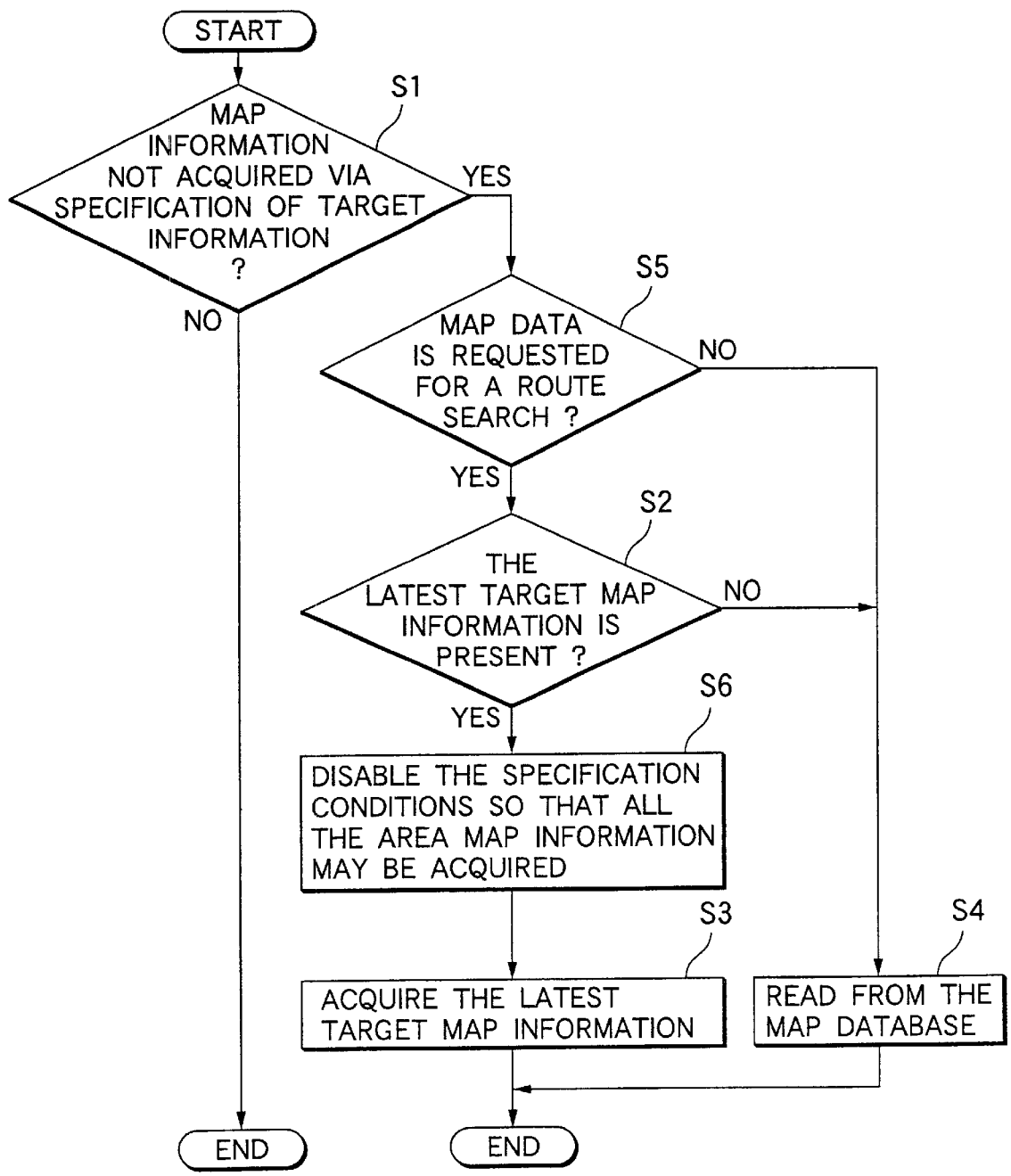
FIG. 5 is a flowchart explaining the operation of a navigation apparatus according to Fourth embodiment of the invention.

FIG. 5 is a flowchart explaining the operation of a navigation apparatus according to Fourth embodiment of the invention. In the figure, components having the same signs as those in FIG. 4 are identical or equivalent components.

When acquiring map information from outside in response to a request from the navigation section 5, the map information acquisition section 3 determines whether the requested map information corresponds to map information that is not candidate for acquisition in the user's specification of target information (S1). In case the map information acquisition section 3 determines that the requested map information corresponds to map information that is not candidate for acquisition, the map information acquisition section 3 determines whether the requested map information is used for a route search (S5). In case the map information acquisition section 3 determines that the map information is requested for a purpose other than a route search, the map information acquisition section 3 performs the processing of S4. In case the map information acquisition section 3 determines that the map information is requested for the purpose of a route search, the map information acquisition section 3 performs determination of S2. In case the map information acquisition section 3 determines that the corresponding map information is present in S2, the map information acquisition section 3 modifies restrictions on the target information specified by the user so that all the map information in the area may be acquired (S6), then performs the processing of S3.

Fifth Embodiment

Figure 6:
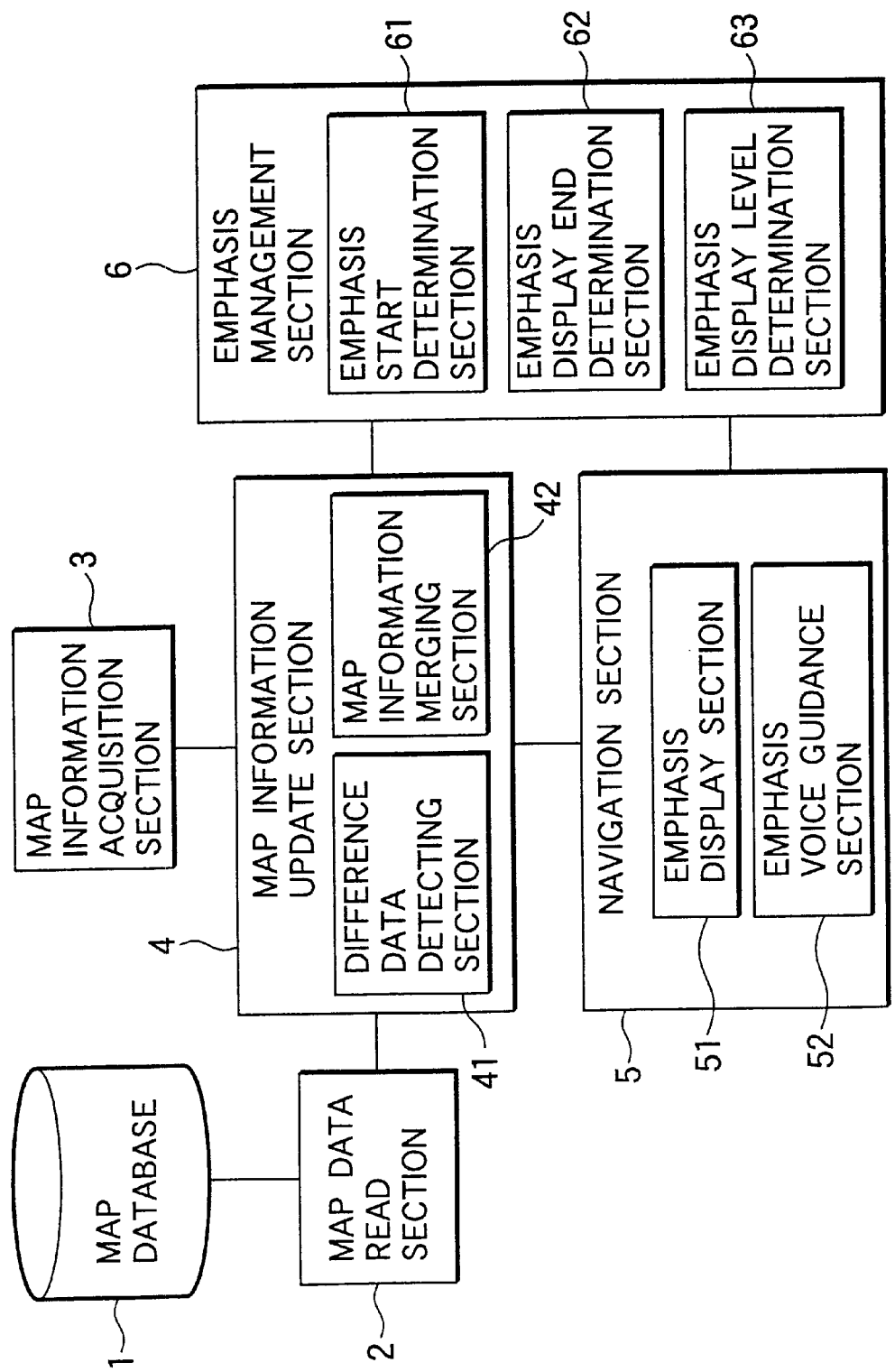
FIG. 6 is a block diagram explaining the configuration of a navigation apparatus according to Fifth embodiment of the invention.

FIG. 6 is a block diagram explaining the configuration of a navigation apparatus according to Fifth embodiment of the invention. In the figure, components having the same signs as those in FIG. 1 are identical or equivalent components. In FIG. 6, a numeral 61 represents an emphasis start determination section, 62 an emphasis display end determination section, and 63 an emphasis display level determination section.

The emphasis management section 6 determines emphasis display on the difference data, or the timing of emphasis voice guidance or level of emphases (emphasis level). The timing of starting emphasis is determined by the emphasis start determination section 61. In case emphasis display of difference data is made, the timing of ending emphasis display is determined by the emphasis display end determination section 62. The emphasis display level determination section 63 determines the level of emphasis display. This determination is made in accordance with the level described in the map information, if any, to the user specification in case the user specifies the level, or to the freshness of individual information described in the map information, if any.

Figure 7:
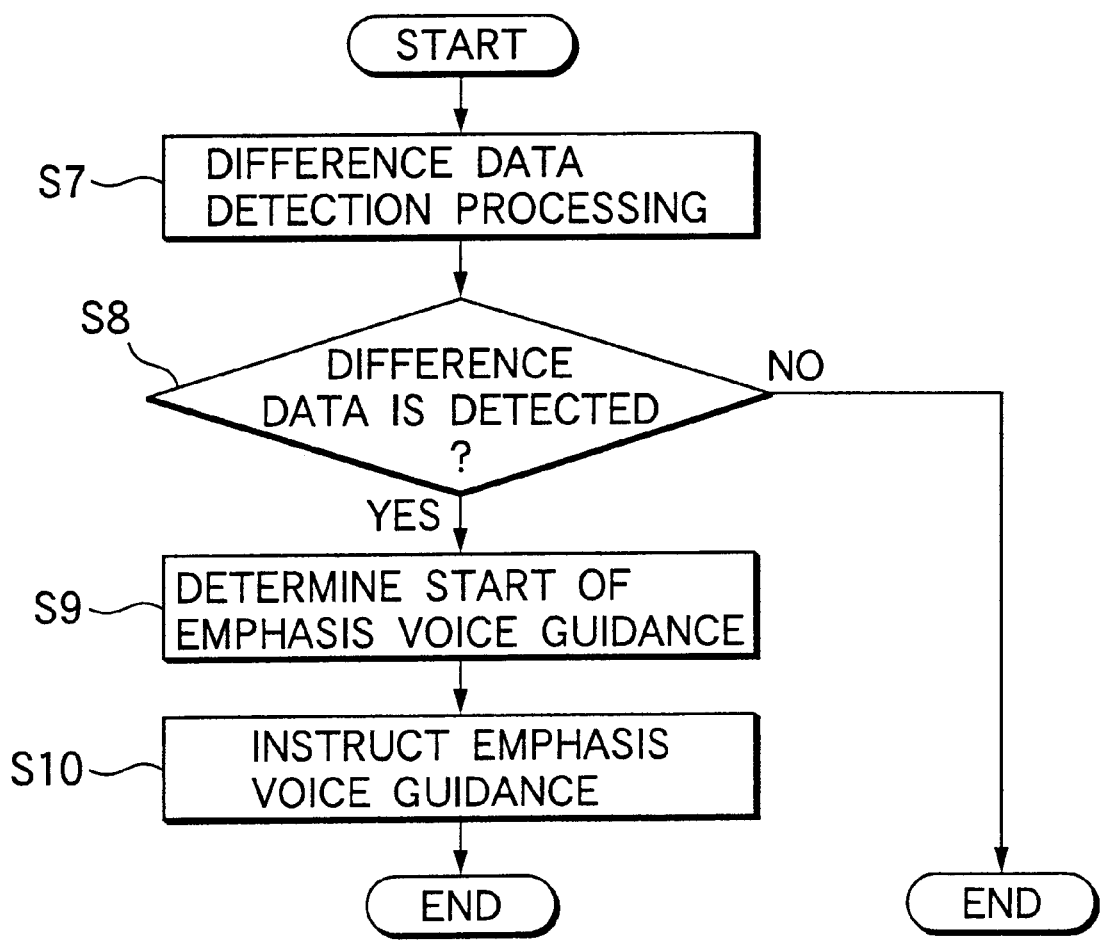
FIG. 7 is a flowchart explaining the operation of a navigation apparatus according to Sixth embodiment of the invention.

FIG. 7 is a flowchart explaining the operation of a navigation apparatus according to Sixth embodiment of the invention. When difference data is detected by the difference data detecting section 41 (S7) and, as a result of this processing, it is determined that the difference data is present (S8), the emphasis start determination section 61 determines start of emphasis (S9). When this determination is made, the emphasis management section 6 instructs the emphasis voice guidance section 52 to give voice guidance such as "Data on the national road No. XX has been updated" (S10).

Seventh Embodiment

Figure 8:
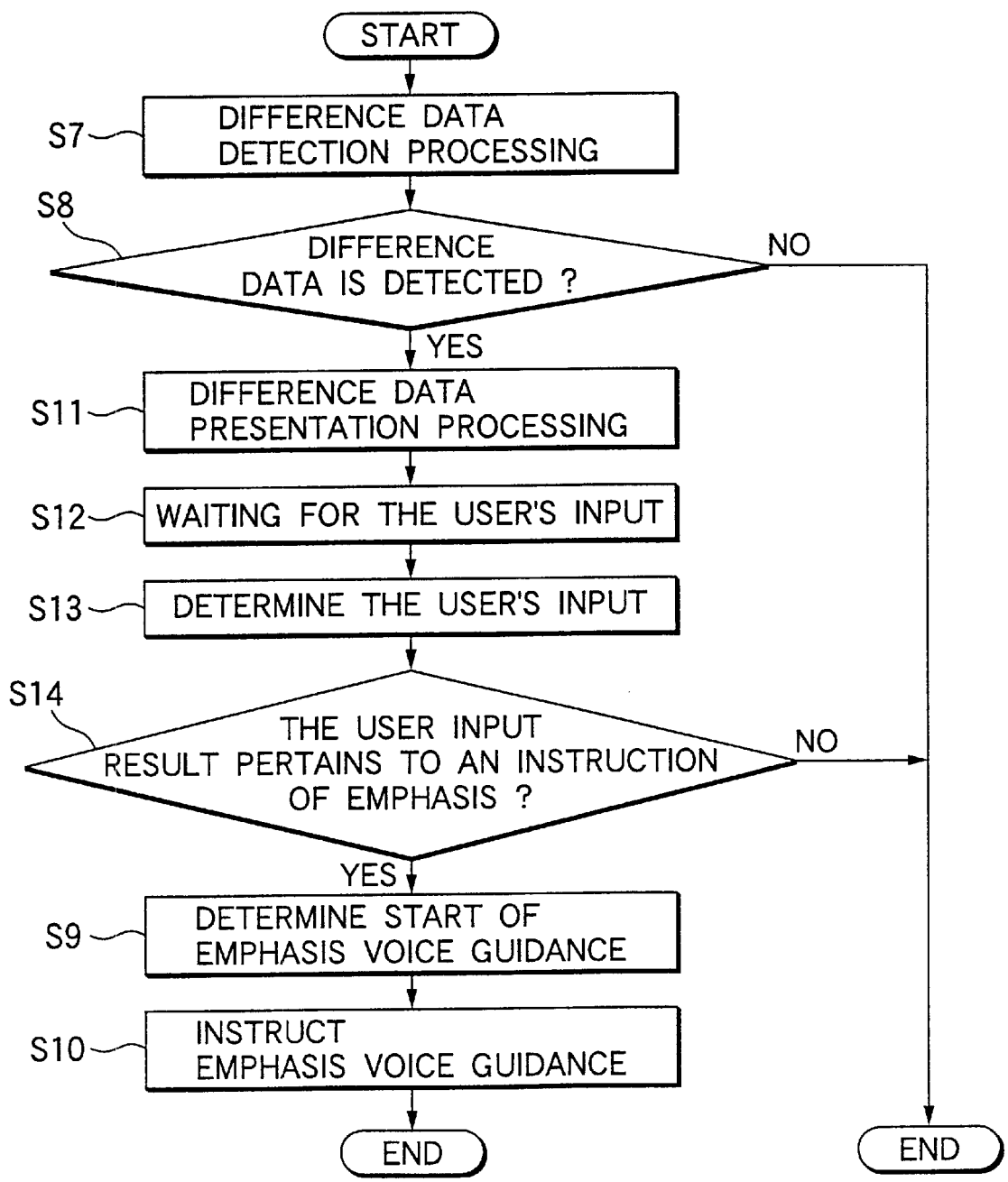
FIG. 8 is a flowchart explaining the operation of a navigation apparatus according to Seventh embodiment of the invention.

FIG. 8 is a flowchart explaining the operation of a navigation apparatus according to Seventh embodiment of the invention. In the figure, components having the same signs as those in FIG. 7 are identical or equivalent components.

When difference data is detected by the difference data detecting section 41 (S7) and, as a result of this processing, it is determined that the difference data is present (S8), the emphasis start determination section 61 presents detection of difference data to the user (S11) and waits for the user's determination on whether the data is to be emphasized (S12). When the user's determination on whether the data is to be emphasized is input, the emphasis start determination section 61 determines whether the input pertains to an instruction of emphasis (S13). In case the result pertains to an instruction of emphasis (S14), the emphasis start determination section 61 determines start of emphasis (S9). When this determination is made, the emphasis management section 6 instructs the emphasis voice guidance section 52 to give voice guidance such as "Data on the national road No. XX has been updated" (S10).

Eighth Embodiment

Figure 9:
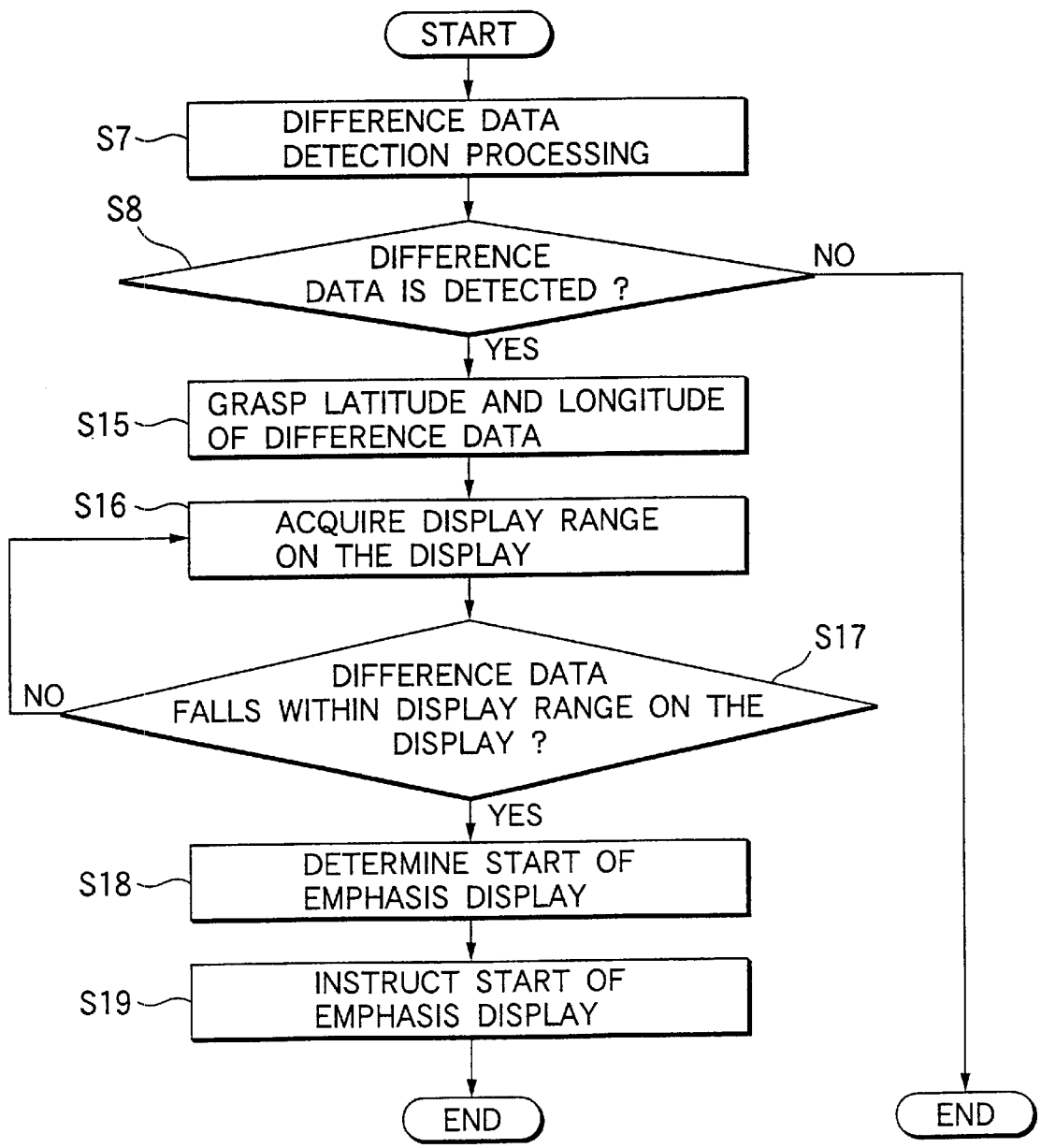
FIG. 9 is a flowchart explaining the operation of a navigation apparatus according to Eighth embodiment of the invention.

FIG. 9 is a flowchart explaining the operation of a navigation apparatus according to Seventh embodiment of the invention. In the figure, components having the same signs as those in FIG. 7 are identical or equivalent components.

When difference data is detected by the difference data detecting section 41 (S7) and, as a result of this processing, it is determined that the difference data is present (S8), the emphasis start determination section 61 obtains the location of difference data on the map (S15). Then the emphasis start determination section 61 acquires a display range on the current display (S16). The emphasis start determination section 61 then determines whether the location of the difference data obtained in S15 falls within the range acquired in S16 (S17). In case the location of the difference data does not fall within the range, execution returns to S16. In case the location of the difference data falls within the range, the emphasis start determination section 61 determines start of emphasis (S18). When this determination is made, the emphasis management section 6 instructs the emphasis display section 51 to provide emphasis display of the difference data (S19).

Ninth Embodiment

Figure 10:
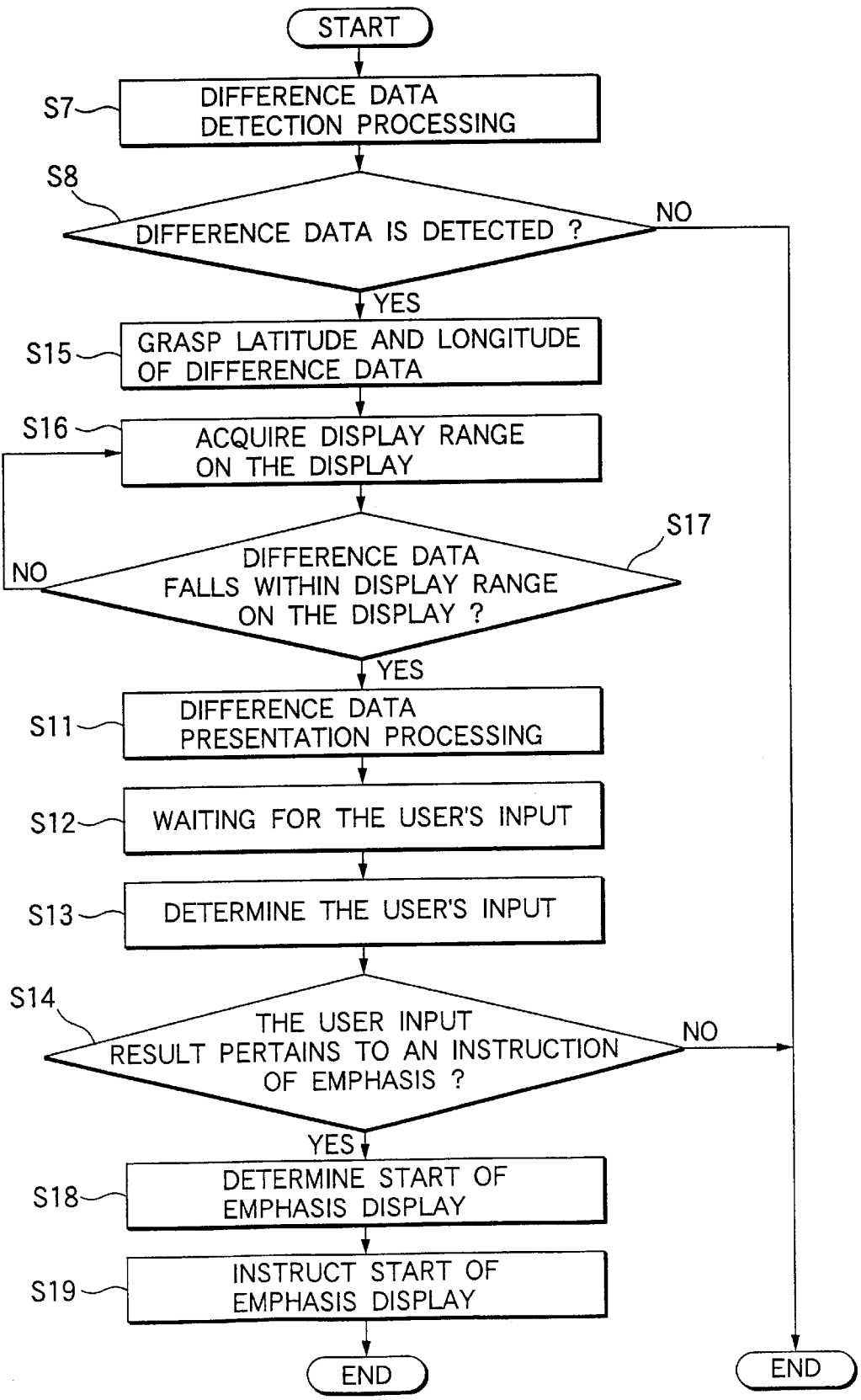
FIG. 10 is a flowchart explaining the operation of a navigation apparatus according to Ninth embodiment of the invention.

FIG. 10 is a flowchart explaining the operation of a navigation apparatus according to Ninth embodiment of the invention. In the figure, components having the same signs as those in FIGS. 8 and 9 are identical or equivalent components.

When it is determined that the location of the difference data falls within the display range in S17 in the procedure similar to that in Eighth embodiment, the emphasis start determination section 61 presents detection of difference data to the user (S11) and waits for the user's determination on whether the data is to be emphasized (S12). When the user's determination on whether the data is to be emphasized is input, the emphasis start determination section 61 determines whether the input pertains to an instruction of emphasis (S13). In case the result pertains to an instruction of emphasis (S14), the emphasis start determination section 61 determines start of emphasis (S18). When this determination is made, the emphasis management section 6 instructs the emphasis display section 51 to provide emphasis display of difference data (S19)

Tenth Embodiment

Figure 11:
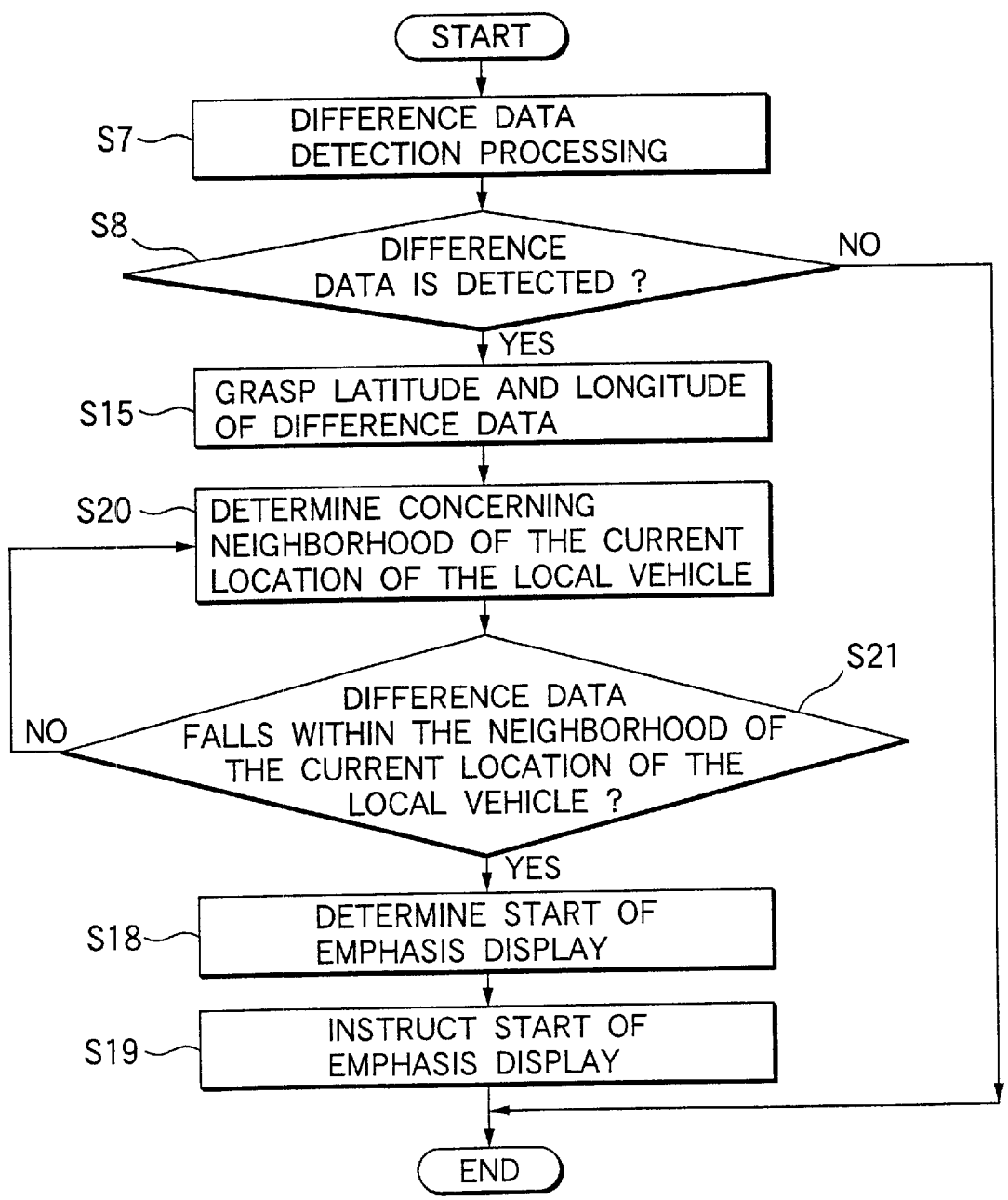
FIG. 11 is a flowchart explaining the operation of a navigation apparatus according to Tenth embodiment of the invention.

FIG. 11 is a flowchart explaining the operation of a navigation apparatus according to Tenth embodiment of the invention. In the figure, components having the same signs as those in FIG. 9 are identical or equivalent components.

When difference data is detected by the difference data detecting section 41 (S7) and, as a result of this processing, it is determined that the difference data is present (S8), the emphasis start determination section 61 obtains the location of difference data on the map (S15). Then the emphasis start determination section 61 determines the relationship between the location of the difference data thus obtained and the neighborhood of the current location of the local vehicle (S20), and determines whether the location of the difference data falls within the neighborhood of the current location of the local vehicle (S21). In case the emphasis start determination section 61 determines that the location of the difference data does not fall within the neighborhood of the current location of the local vehicle, execution returns to S20. In case the emphasis start determination section 61 determines that the location of the difference data falls within the neighborhood of the current location of the local vehicle, the emphasis start determination section 61 determines start of emphasis (S18). When this determination is made, the emphasis management section 6 instructs the emphasis display section 51 to provide emphasis display of the difference data (S19).

Eleventh Embodiment

Figure 12:
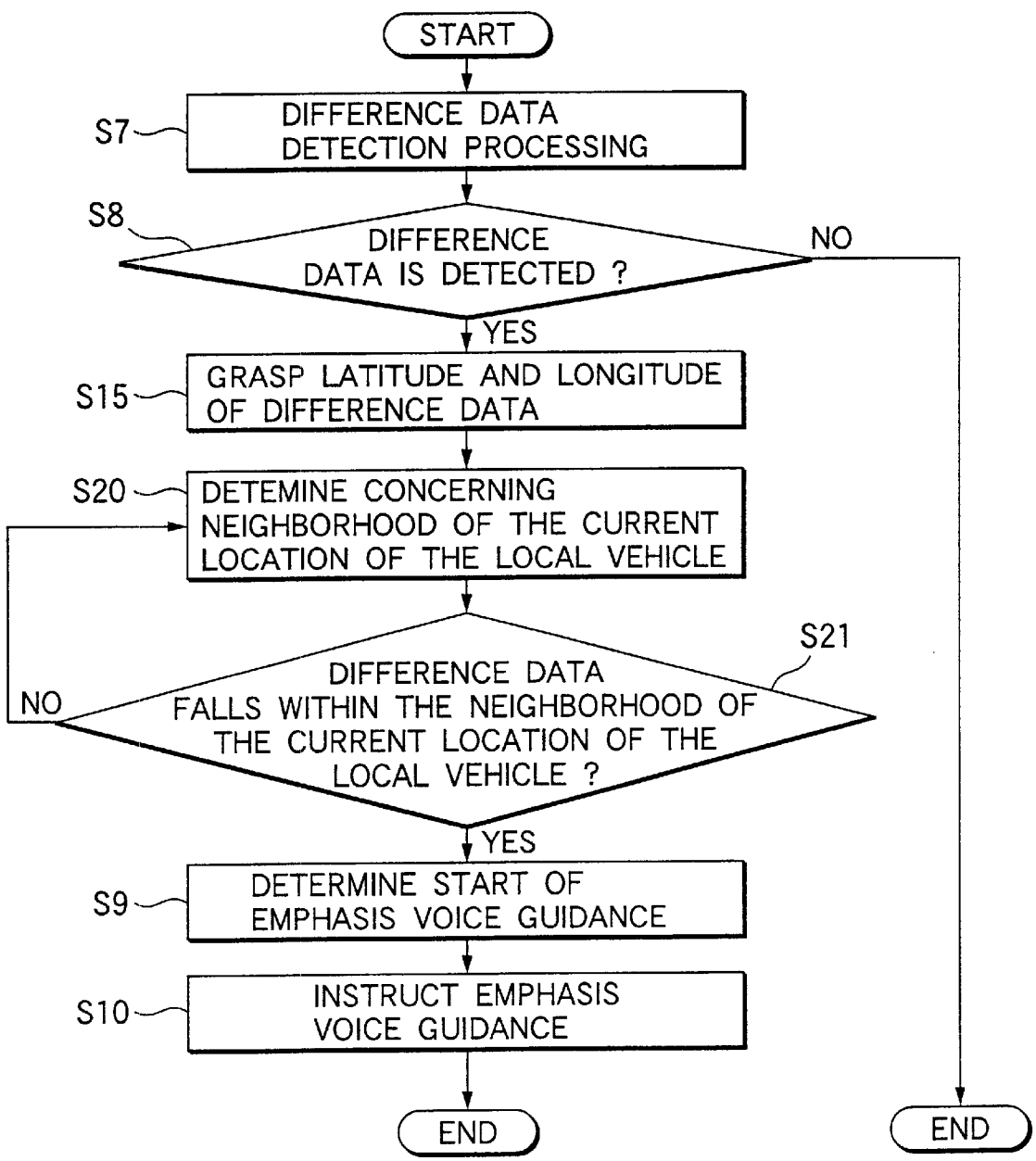
FIG. 12 is a flowchart explaining the operation of a navigation apparatus according to Eleventh embodiment of the invention.

FIG. 12 is a flowchart explaining the operation of a navigation apparatus according to Eleventh embodiment of the invention. In the figure, components having the same signs as those in FIGS. 7 and 11 are identical or equivalent components.

When it is determined that the location of the difference data falls within the neighborhood of the current location of the local vehicle in S21 in the procedure similar to that in Tenth embodiment, the emphasis start determination section 61 determines start of emphasis (S9). When this determination is made, the emphasis management section 6 instructs the emphasis voice guidance section 52 to give voice guidance such as "Data on the national road No. XX has been updated" (S10).

Twelfth Embodiment

Figure 13:
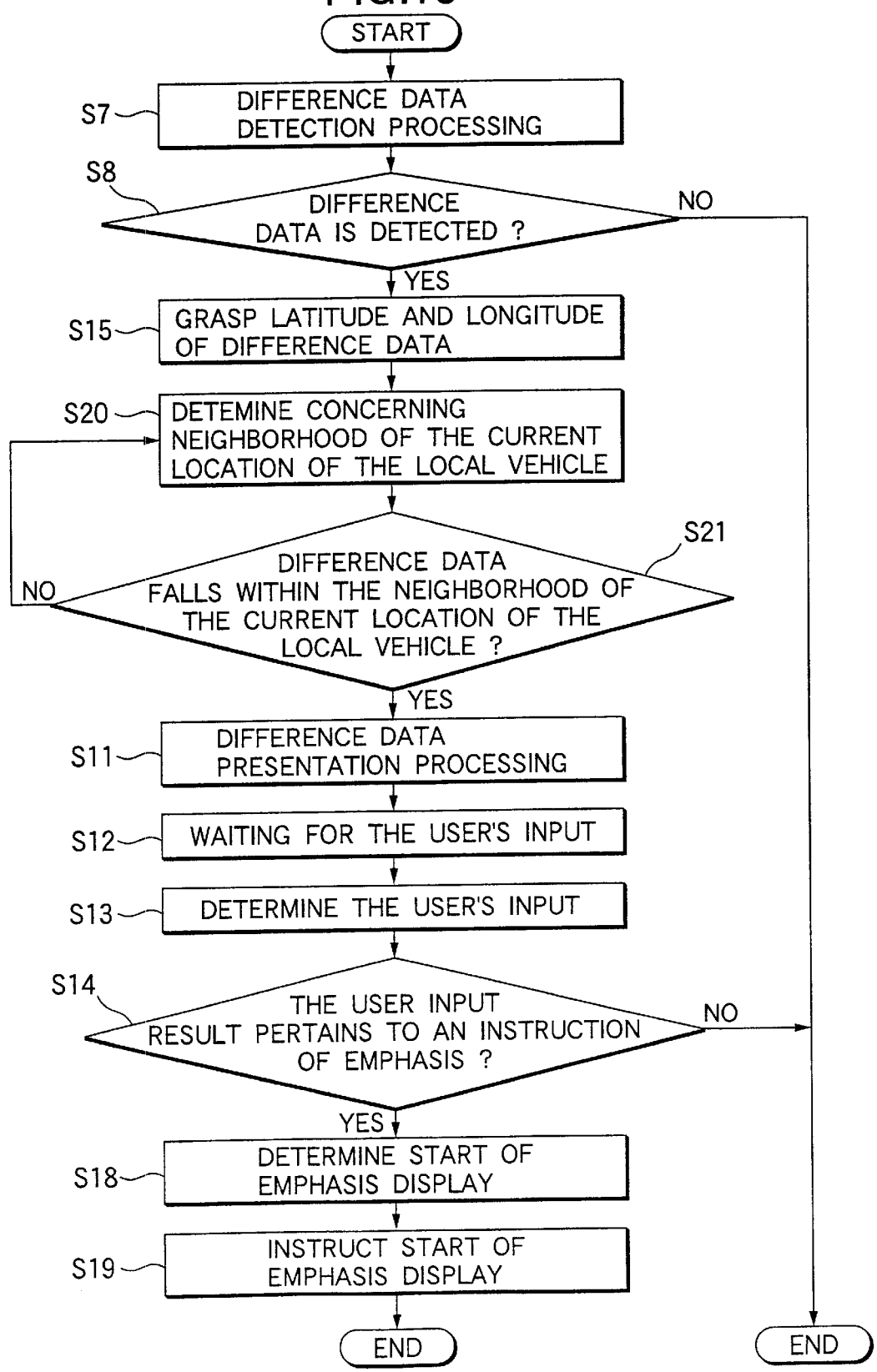
FIG. 13 is a flowchart explaining the operation of a navigation apparatus according to Twelfth embodiment of the invention.

FIG. 13 is a flowchart explaining the operation of a navigation apparatus according to Twelfth embodiment of the invention. In the figure, components having the same signs as those in FIGS. 8 and 11 are identical or equivalent components.

When it is determined that the location of the difference data falls within the neighborhood of the current location of the local vehicle in S21 in the procedure similar to that in Tenth embodiment, the emphasis start determination section 61 presents detection of difference data to the user (S11) and waits for the user's determination on whether the data is to be emphasized (S12). When the user's determination on whether the data is to be emphasized is input, the emphasis start determination section 61 determines whether the input pertains to an instruction of emphasis (S13). In case the result pertains to an instruction of emphasis (S14), the emphasis management section 6 instructs the emphasis display section 51 to provide emphasis display of difference data (S19).

Thirteenth Embodiment

Figure 14:
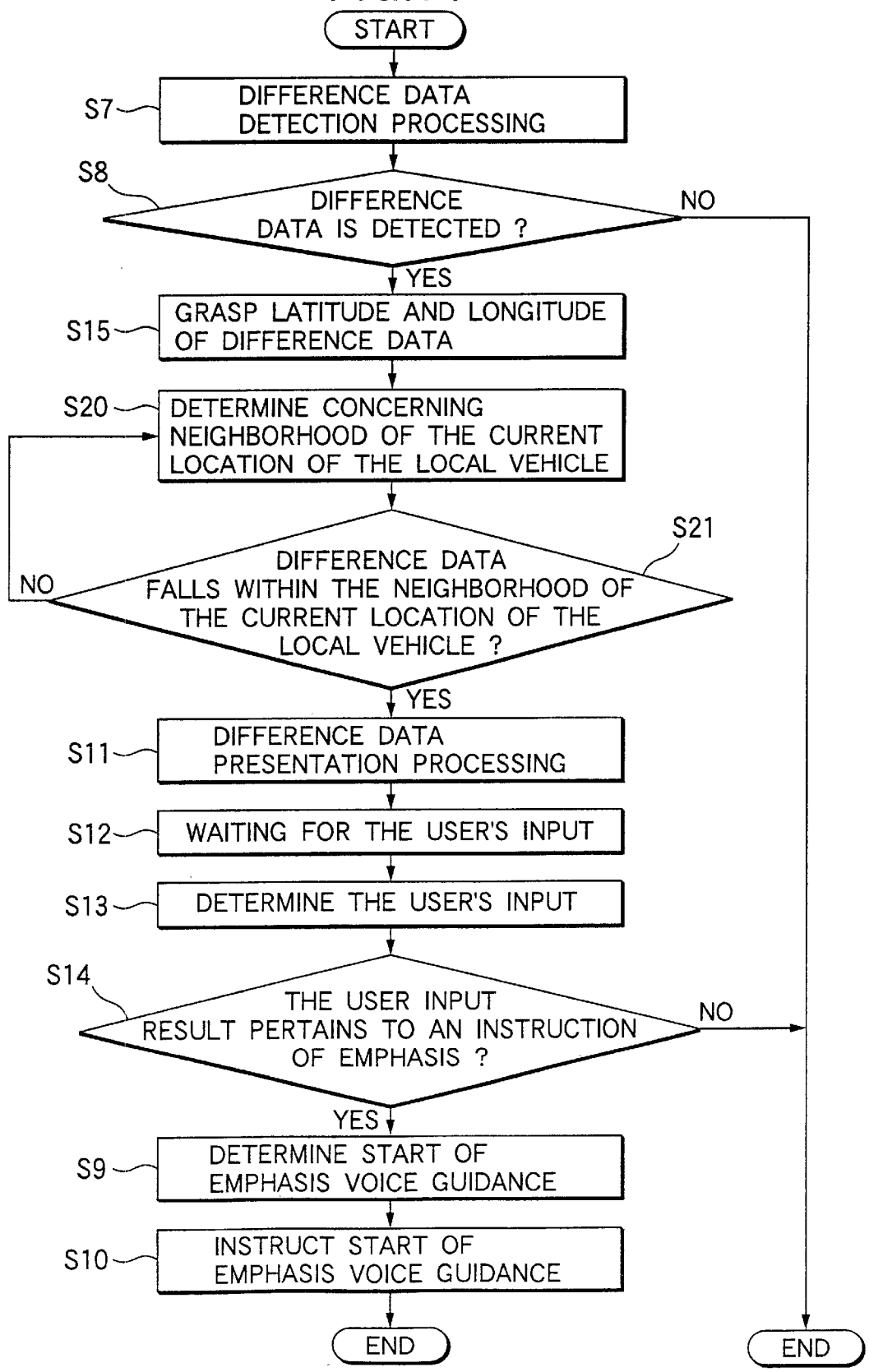
FIG. 14 is a flowchart explaining the operation of a navigation apparatus according to Thirteenth embodiment of the invention.

FIG. 14 is a flowchart explaining the operation of a navigation apparatus according to Thirteenth embodiment of the invention. In the figure, components having the same signs as those in FIGS. 8 and 12 are identical or equivalent components.

When it is determined that the user's input pertains to an instruction of emphasis in S14 in the procedure similar to that in Twelfth embodiment, the emphasis start determination section 61 determines start of emphasis (S9). When this determination is made, the emphasis management section 6 instructs the emphasis voice guidance section 52 to give voice guidance such as "Data on the national road No. XX has been updated" (S10).

Fourteenth Embodiment

FIGS. 15A and 15B are flowcharts explaining the operation of a navigation apparatus according to Fourteenth embodiment of the invention. In the figure, components having the same signs as those in FIGS. 7 and 9 are identical or equivalent components.

When difference data is detected by the difference data detecting section 41 (S7) and, as a result of this processing, it is determined that the difference data is present (S8), as shown in FIG. 15A, the emphasis start determination section 61 stores the difference data (S22). Receiving the user's input to instruct start of emphasis (S23), as shown in FIG. 15B, the emphasis start determination section 61 notifies the navigation section 5 of the difference data stored in S22 (S24). The emphasis start determination section 61 then determines start of emphasis display (S18). When this determination is made, the emphasis management section 6 instructs the emphasis display section 51 to provide emphasis display of the difference data (S19).

While start of emphasis display is determined and emphasis display instructed in S18 and S19 after difference data has been notified to the navigation section 5 in this example, it is possible to determine start of emphasis voice guidance and instruct emphasis voice guidance. Difference data notified to the navigation section 5 in S24 may be restricted to data that falls within the display range of the current display or data that falls within the neighborhood of the current location of the local vehicle.

Fifteenth Embodiment

FIG. 16 is a flowchart explaining the operation of a navigation apparatus according to Ninth embodiment of the invention. In the figure, components having the same signs as those in FIG. 9 are identical or equivalent components.

When the emphasis management section 6 instructs the emphasis display section 51 to provide emphasis display of the difference data (S19), the emphasis display end determination section 62 calculates the elapsed time since S19 (S25) and determines whether the elapsed time has exceeded the preset time (S26). In case it is determined that the elapsed time has not exceeded the preset time, execution returns to S25. In case it is determined that the elapsed time has exceeded the preset time, end of emphasis display is determined (S27) and the emphasis management section 6 instructs the emphasis display section 51 to end emphasis display (S28).

Sixteenth Embodiment

Figure 17:
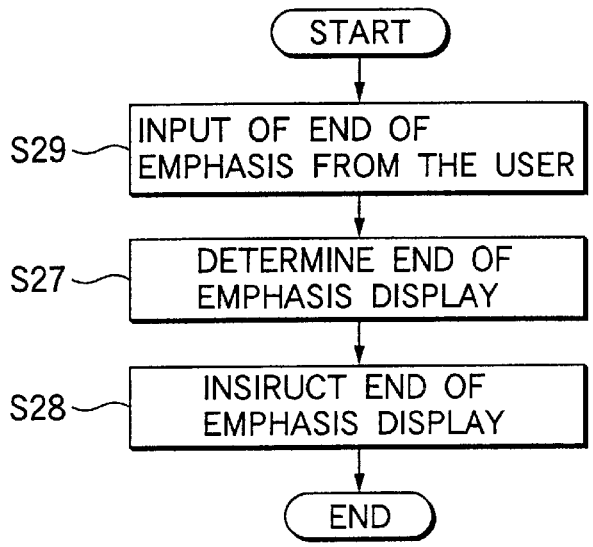
FIG. 17 is a flowchart explaining the operation of a navigation apparatus according to Sixteenth embodiment of the invention.

FIG. 17 is a flowchart explaining the operation of a navigation apparatus according to Sixteenth embodiment of the invention. In the figure, components having the same signs as those in FIG. 16 are identical or equivalent components.

Receiving the user's input to instruct end of emphasis display (S29), the emphasis management section 6 instructs the emphasis display section 51 to end emphasis display (S28).

Seventeenth Embodiment

Figure 18A:
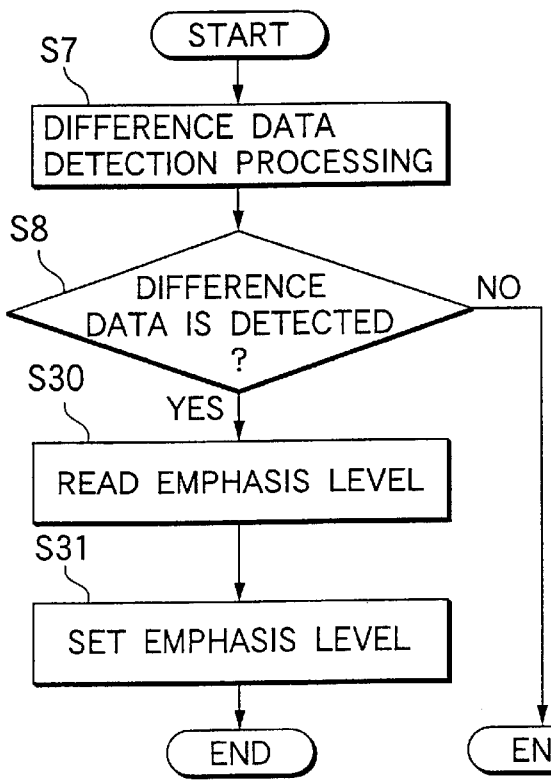
FIGS. 18A and 18B are flowcharts explaining the operation of a navigation apparatus according to Seventeenth embodiment of the invention.
Figure 18B:
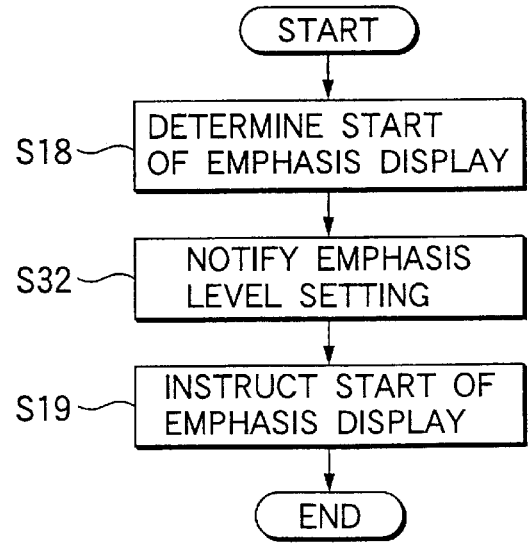

FIGS. 18A and 18B are flowcharts explaining the operation of a navigation apparatus according to Seventeenth embodiment of the invention. In the figure, components having the same signs as those in FIG. 9 are identical or equivalent components.

When difference data is detected by the difference data detecting section 41 (S7) and, as a result of this processing, it is determined that the difference data is present (S8), as shown in FIG. 18A, the emphasis display level determination section 63 reads the emphasis level of individual data (S30) and sets the emphasis level corresponding to the individual data in accordance with the read emphasis level (S31).

When the emphasis display level determination section 63 determines start of emphasis display (S18), as shown in FIG. 18B, the emphasis display level determination section 63 notifies the emphasis display section 51 of the emphasis level of individual data (S32). The emphasis management section 6 instructs the emphasis display section 51 to start emphasis display (S19).

Eighteenth Embodiment

Figure 19:
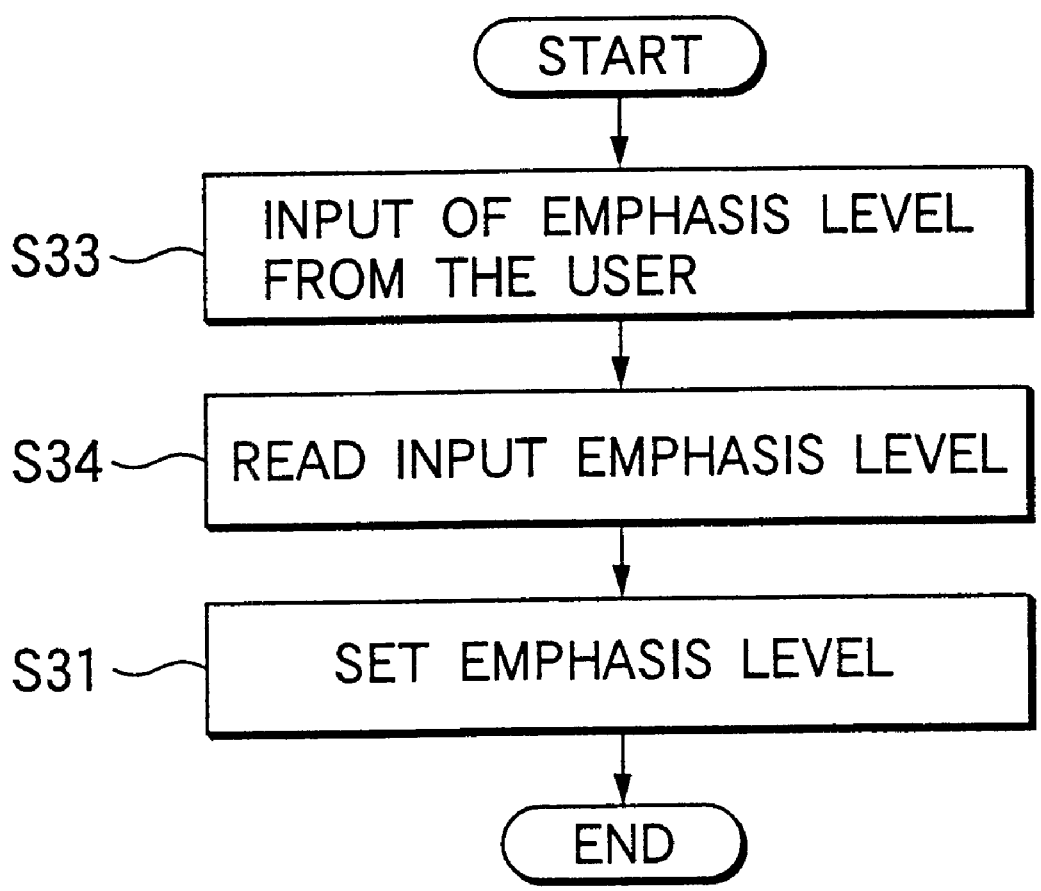
FIG. 19 is a flowchart explaining the operation of a navigation apparatus according to Eighteenth embodiment of the invention.

FIG. 19 is a flowchart explaining the operation of navigation apparatus according to Eighteenth embodiment of the invention. In the figure, components having the same signs as those in FIGS. 18A and 18B are identical or equivalent components.

Receiving the user's input of specification on the level of emphasis display (S33), the emphasis display level determination section 63 reads the input level (S34) and sets the emphasis level corresponding to the individual data (S31). The subsequent operation is the same as that in Seventeenth embodiment.

Nineteenth Embodiment

Figure 20:
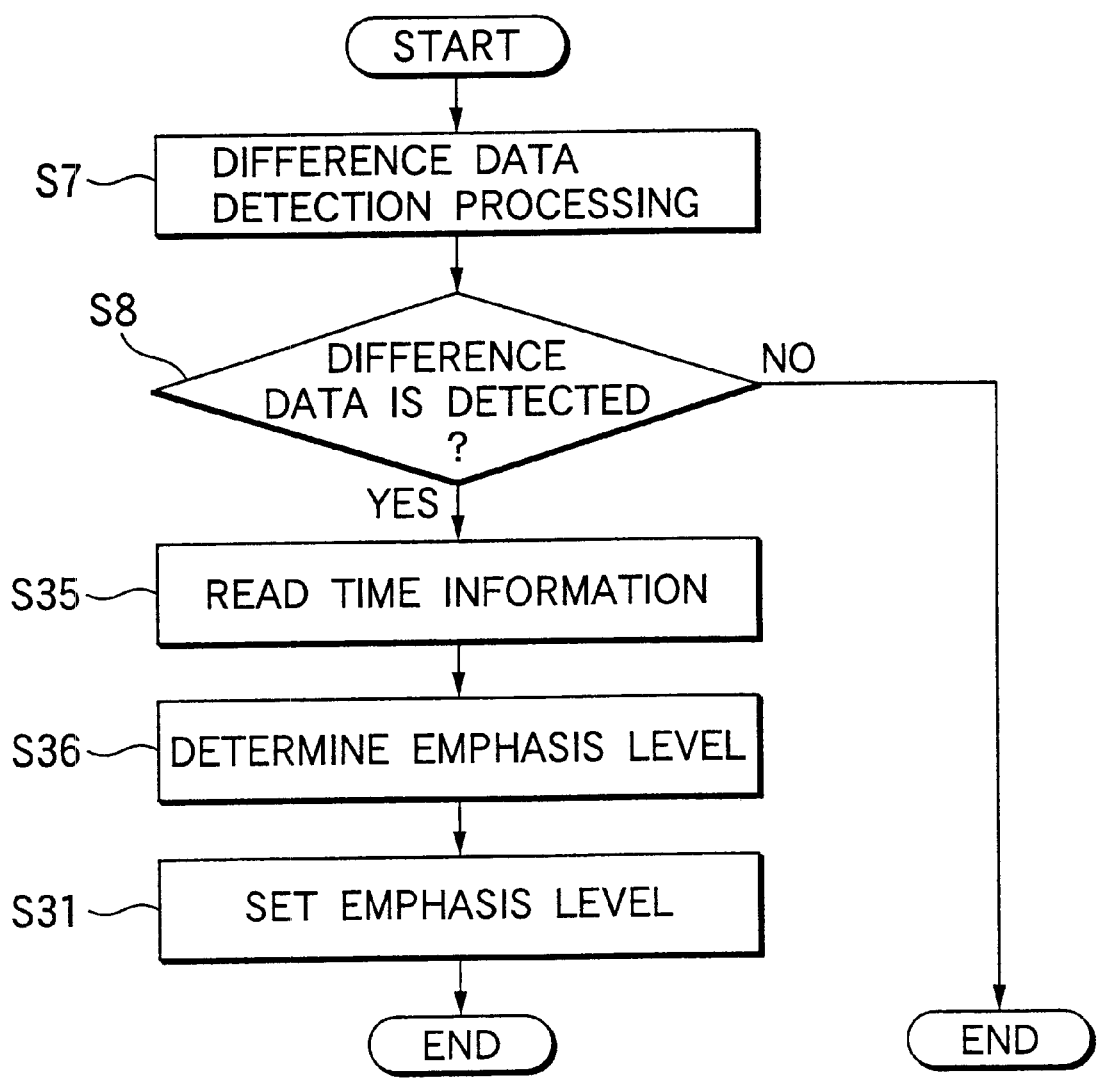
FIG. 20 is a flowchart explaining the operation of a navigation apparatus according to Nineteenth embodiment of the invention.

FIG. 20 is a flowchart explaining the operation of a navigation apparatus according to Nineteenth embodiment of the invention. In the figure, components having the same signs as those in FIGS. 18A and 18B are identical or equivalent components.

When difference data is detected by the difference data detecting section 41 (S7) and, as a result of this processing, it is determined that the difference data is present (S8), the emphasis display level determination section 63 reads time information on individual data described in the difference data (S35). The emphasis display level determination section 63 determines the emphasis level according to the read time information (S36) and sets determined emphasis level corresponding to individual data (S31). The subsequent operation is the same as that in Seventeenth embodiment.

Twentieth Embodiment

Figure 21:
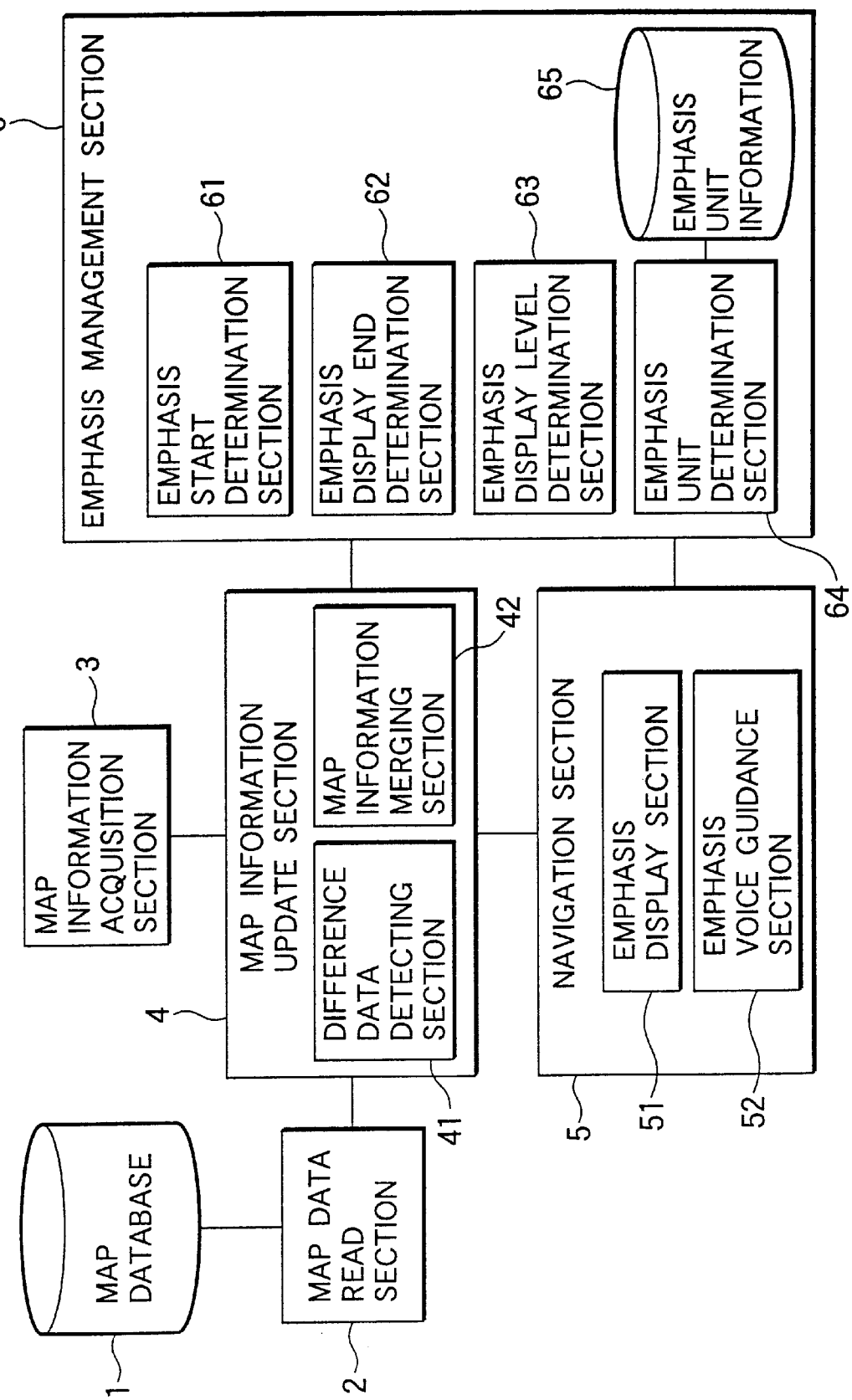
FIG. 21 is a block diagram explaining the configuration of a navigation apparatus according to Twentieth embodiment of the invention.

FIG. 21 is a block diagram explaining the configuration of a navigation apparatus according to Twentieth embodiment of the invention. In the figure, components having the same signs as those in FIG. 6 are identical or equivalent components.

The emphasis unit determination section 64 receives the user's setting of items to be emphasized such as roads and facilities in advance, and stores the setting as emphasis unit information 65. When the difference data detecting section 41 detects difference data, the emphasis unit information 65 is used to determine whether the difference data is included in the items set via the user specification. In case the difference data is included in the set items, the difference data is emphasized, same as Fifth embodiment.

Twenty-First Embodiment

Figure 22:
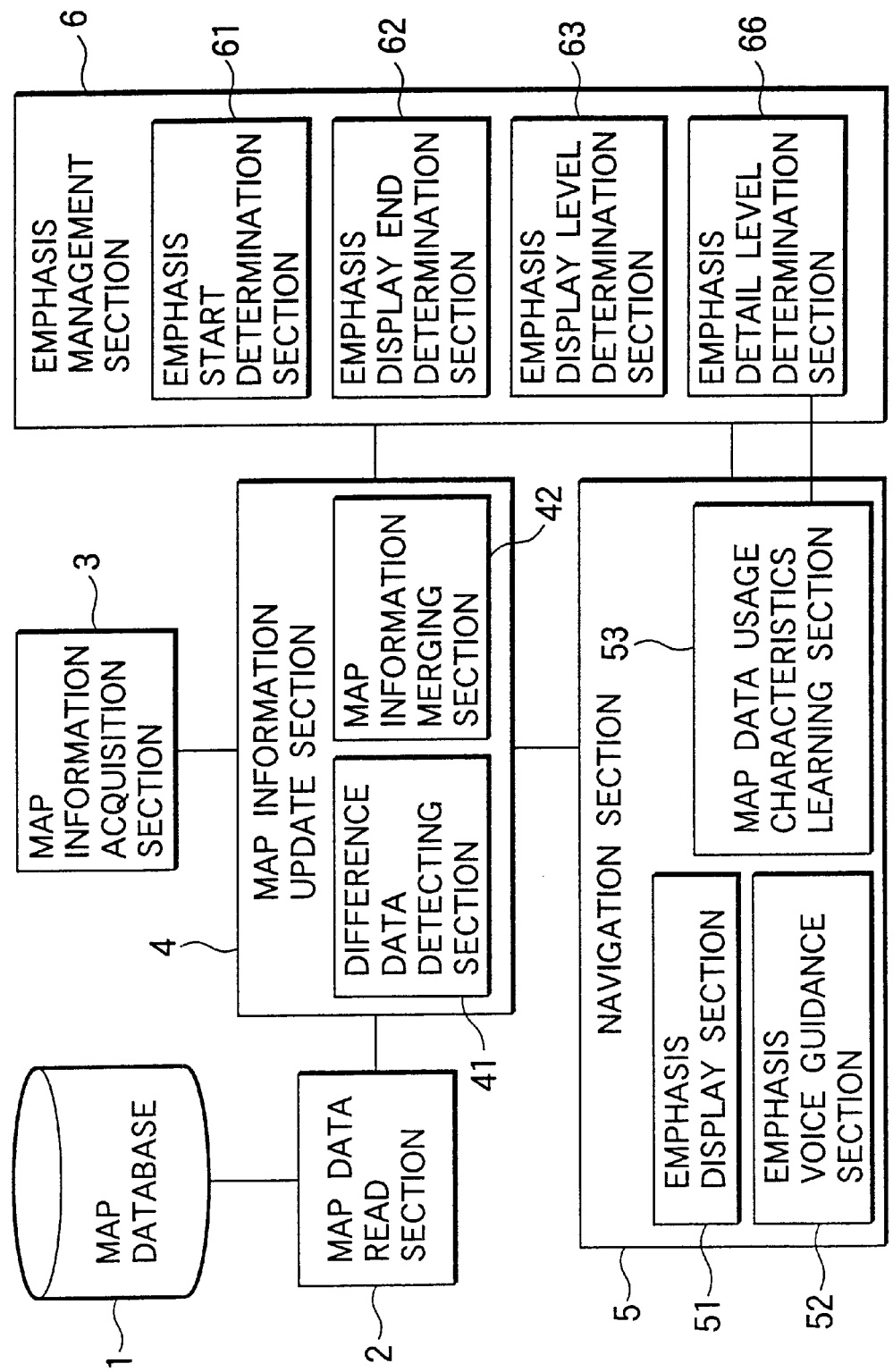
FIG. 22 is a block diagram explaining the configuration of a navigation apparatus according to Twenty-first embodiment of the invention.

FIG. 22 is a block diagram explaining the configuration of a navigation apparatus according to Twenty-first embodiment of the invention. In the figure, components having the same signs as those in FIG. 6 are identical or equivalent components.

The emphasis display level determination section 63 updates the usage history (not shown) of map data each time the navigation section 5 uses the map data to implement various features and thus learns characteristics on the usage frequency of map data. The usage characteristics learned by the map data usage characteristics learning section 53 is sent to the emphasis detail level determination section 66. The emphasis detail level determination section 66, receiving the usage characteristics of map data, determines the detail level of emphasis of difference data based on the usage characteristics, in accordance with the usage frequency of the map data within the range containing difference data to be emphasized. The emphasis detail level determination section 66 determines the emphasis level so that the details of modifications presented to the user is changed depending on the usage frequency in the following way. Difference data that belongs to map data that is frequently used can possibly be the map data in the neighborhood of locations frequented by the user. The emphasis detail level determination section 66 presents details of update in such difference data. Meanwhile, the emphasis detail level determination section 66 presents only the fact that the data has been modified to the user incase the difference data belongs to map data that is less frequently used.

Twenty-Second Embodiment

Figure 23:
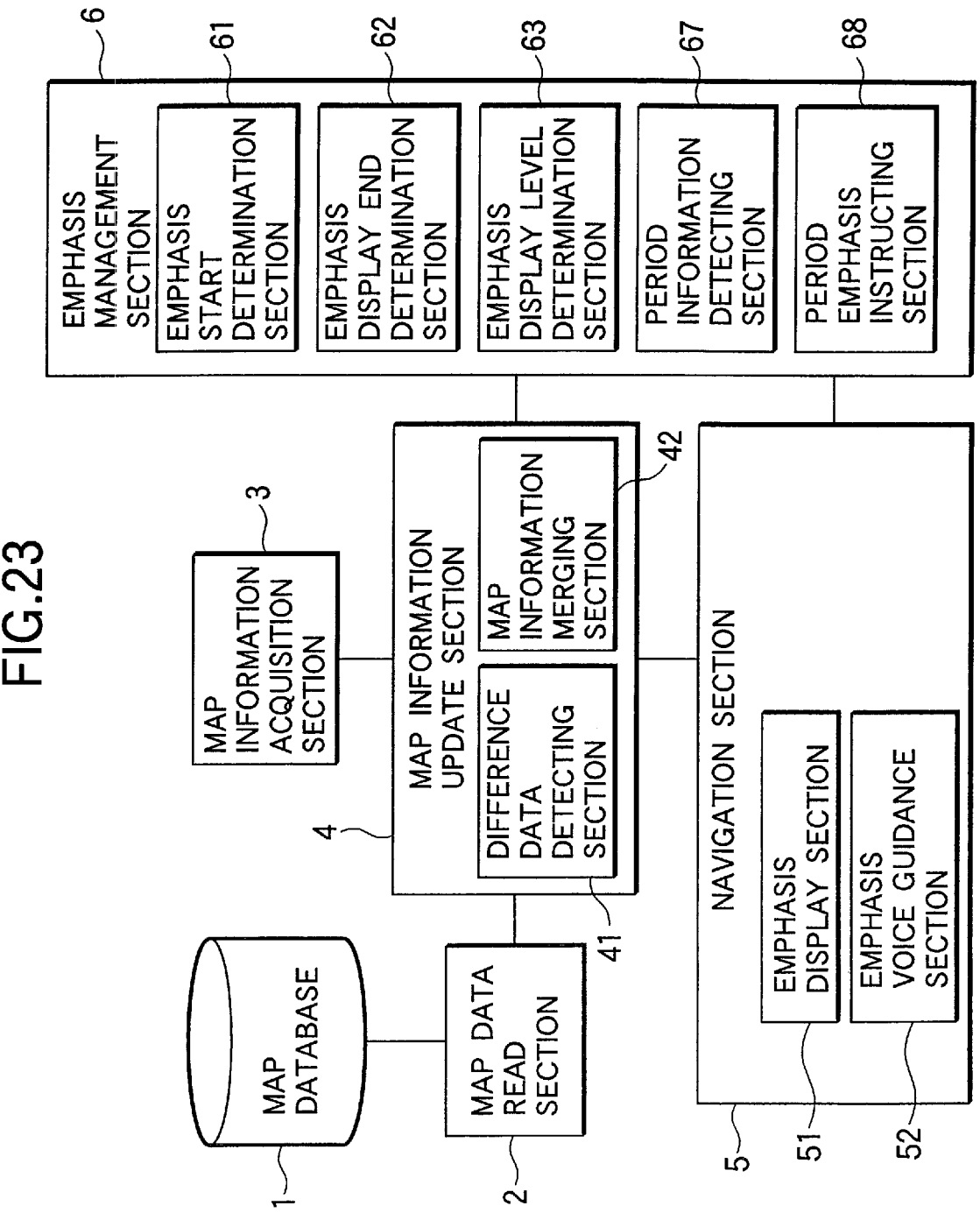
FIG. 23 is a block diagram explaining the configuration of a navigation apparatus according to Twenty-second embodiment of the invention.

FIG. 23 is a block diagram explaining the configuration of a navigation apparatus according to Twenty-second embodiment of the invention. In the figure, components having the same signs as those in FIG. 6 are identical or equivalent components. In FIG. 23, a numeral 67 represents due date information detecting section and 68 due date emphasis instructing section.

Figure 24:
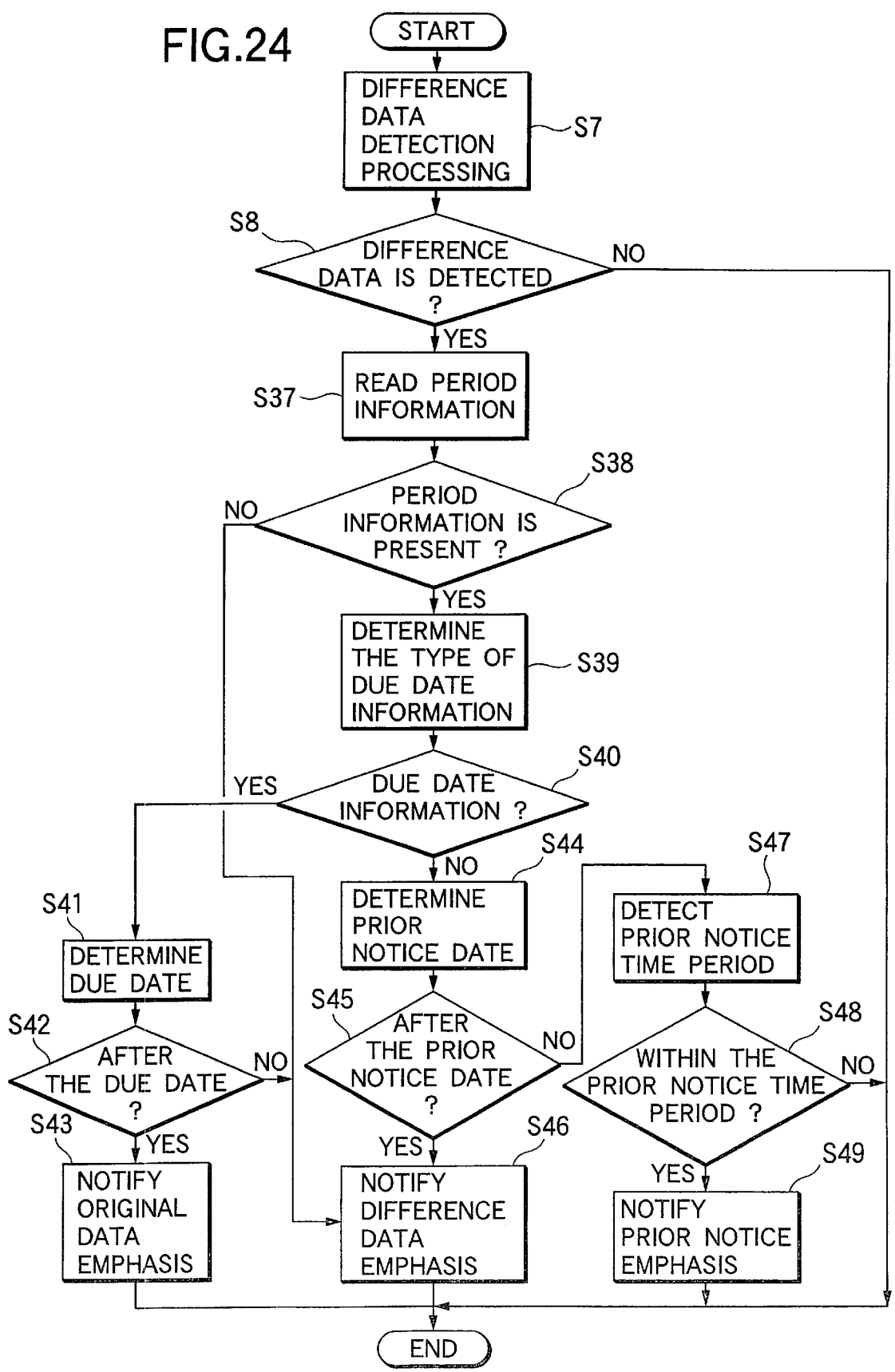
FIG. 24 is a flowchart explaining the operation of a navigation apparatus according to Twenty-second embodiment of the invention.

FIG. 24 is a flowchart explaining the operation of navigation apparatus according to Twenty-second embodiment of the invention. In the figure, components having the same signs as those in FIG. 7 are identical or equivalent components.

When difference data is detected by the difference data detecting section 41 (S7) and, as a result of this processing, it is determined that the difference data is present (S8), the period information detecting section 67 reads period information from the difference data (S37). When it is determined that period information is read (S38), information type of the information described as period information, that is, due date information or prior notice information, is acquired (S39). In case the acquired information type is due date information (S40), the current time is compared with the due date information (S41) and it is determined whether the due date indicated by the due date information has expired (S42). In case it is determined that the due date has expired, the due date emphasis instructing section 68 specifies the original data corresponding to the difference data as emphasis target data to the navigation section 5 (S43). In case it is determined that the due date has not expired, the due date emphasis instructing section 68 specifies the difference data as emphasis target data to the navigation section 5 (S46).

When it is determined that the period information is prior notice information in S40, the current time is compared with the prior notice information (S44) to determined whether the prior notice date has expired (S45). In case it is determined that the prior notice date has expired, the period emphasis instructing section 68 specifies the difference data as emphasis target data to the navigation section 5 (S46). In case it is determined that the prior notice date has not expired, the period emphasis instructing section 68 calculates the time period prior notice emphasis is made (S47) and it is determined whether the current time is included in the prior notice emphasis time period (S48). In case the current time is included in the prior notice emphasis term, the period emphasis instructing section 68 specifies the difference data as emphasis target data to the navigation section 5 (S46).

In case it is determined that period information is not present in the difference date in S38, the period emphasis instructing section 68 specifies the difference data as emphasis target data to the navigation section 5 (S46).

Twenty-Third Embodiment

Figure 25:
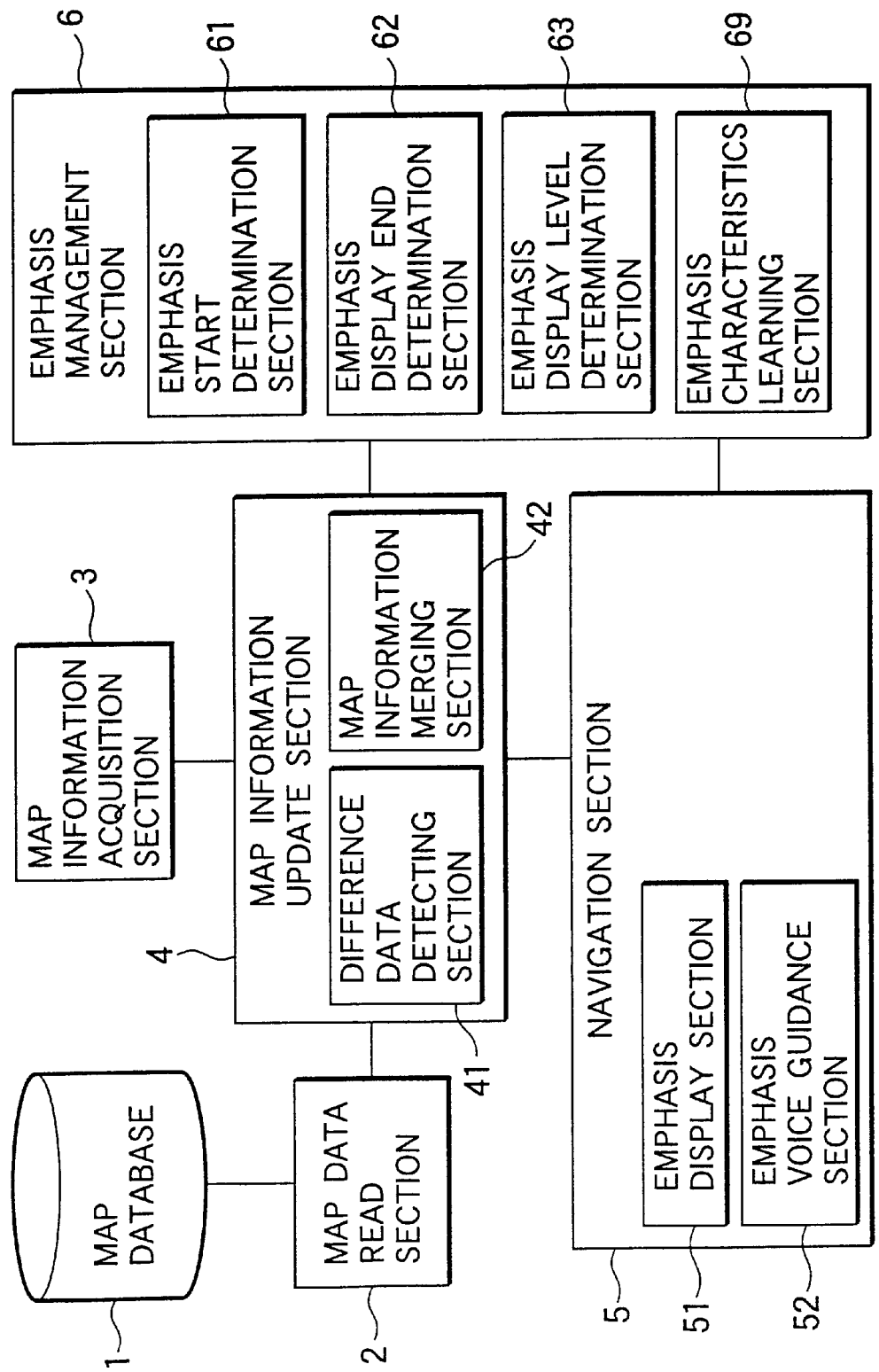
FIG. 25 is a block diagram explaining the configuration of a navigation apparatus according to Twenty-fourth embodiment of the invention.

FIG. 25 is a block diagram explaining the configuration of a navigation apparatus according to Twenty-third embodiment of the invention. In the figure, components having the same signs as those in FIG. 6 are identical or equivalent components.

The emphasis characteristics learning section 69 learns the emphasis characteristics of the user based on the input of the emphasis timing and emphasis level specified by the user. The emphasis characteristics learning section 69 then determines the timing and level of emphasis based on the learned emphasis characteristics, and specifies the timing and level of emphasis to the emphasis display section 51 and the emphasis voice guidance section 52. The emphasis characteristics learning section 69 also presents the learning results to the user before specifying the learned emphasis characteristics to the emphasis display section 51 and the emphasis voice guidance section 52. When the user wishes to make emphasis with a timing and/or a level different from the presented learning results, the emphasis characteristics learning section 69 lets the user input the change and accordingly make instructions to the emphasis display section 51 and the emphasis voice guidance section 52.

Twenty-Fourth Embodiment

Figure 26:
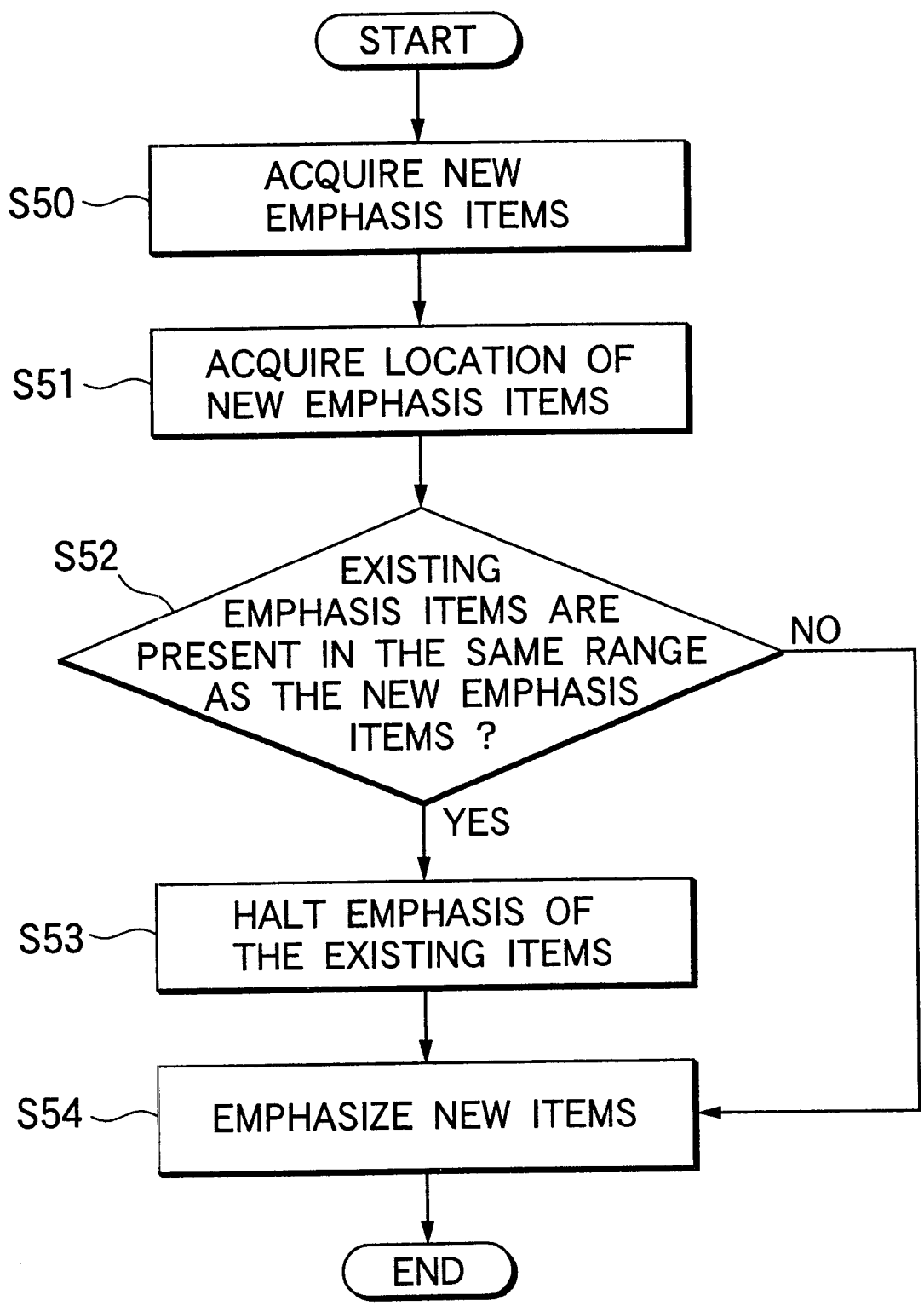
FIG. 26 is a flowchart explaining the operation of the navigation apparatus according to Twenty-fourth embodiment of the invention.

FIG. 26 is a flowchart explaining the operation of a navigation apparatus according to Twenty-fourth embodiment of the invention.

The emphasis display section 51, receiving an emphasis display instruction from the emphasis management section 6 (S50), obtains the map range where the instructed items to be emphasized (S51), and determines whether emphasized items are present in the range (S52). In case emphasized items are present in the range, the emphasis display section 51 halts emphasis of the items (S53) and displays emphatically the new items to be emphasized (S54). In case no items are emphasized in S52, the emphasis display section 51 displays emphatically the new items to be emphasized in S54.

Twenty-Fifth Embodiment

Figure 27:
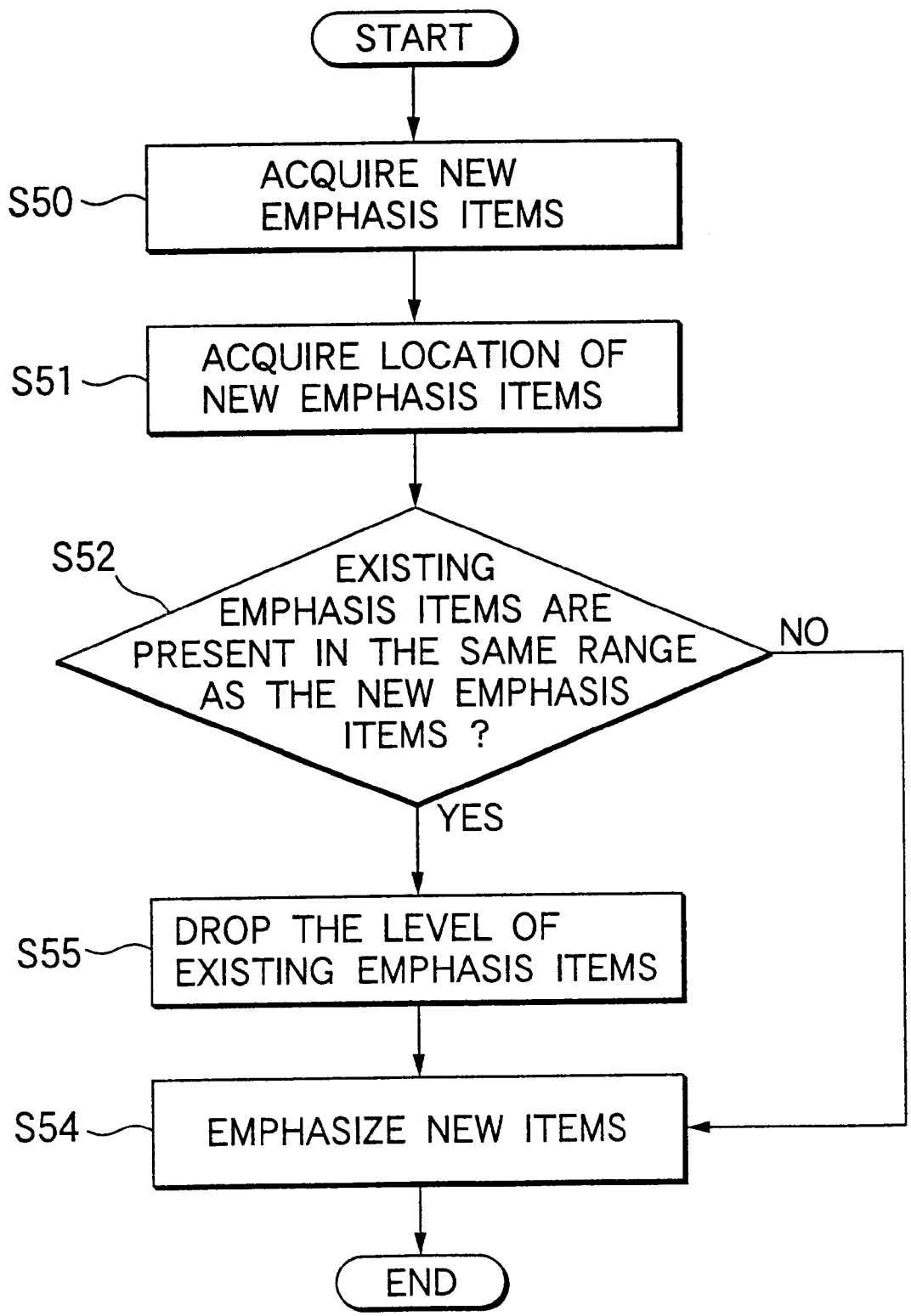
FIG. 27 is a flowchart explaining the operation of a navigation apparatus according to Twenty-fifth embodiment of the invention.

FIG. 27 is a flowchart explaining the operation of a navigation apparatus according to Twenty-fifth embodiment of the invention. In the figure, components having the same signs as those in FIG. 26 are identical or equivalent components.

The emphasis display section 51, receiving an emphasis display instruction from the emphasis management section 6 (S50), obtains the map range where the instructed items to be emphasized (S51), and determines whether emphasized items are present in the range (S52). In case emphasized items are present in the range, the emphasis display section 51 drops the level of emphasis of the items (S55) and displays emphatically the new items to be emphasized (S54). In case no items are emphasized in S52, the emphasis display section 51 displays emphatically the new items to be emphasized in S54.

Twenty-Sixth Embodiment

Figure 28:
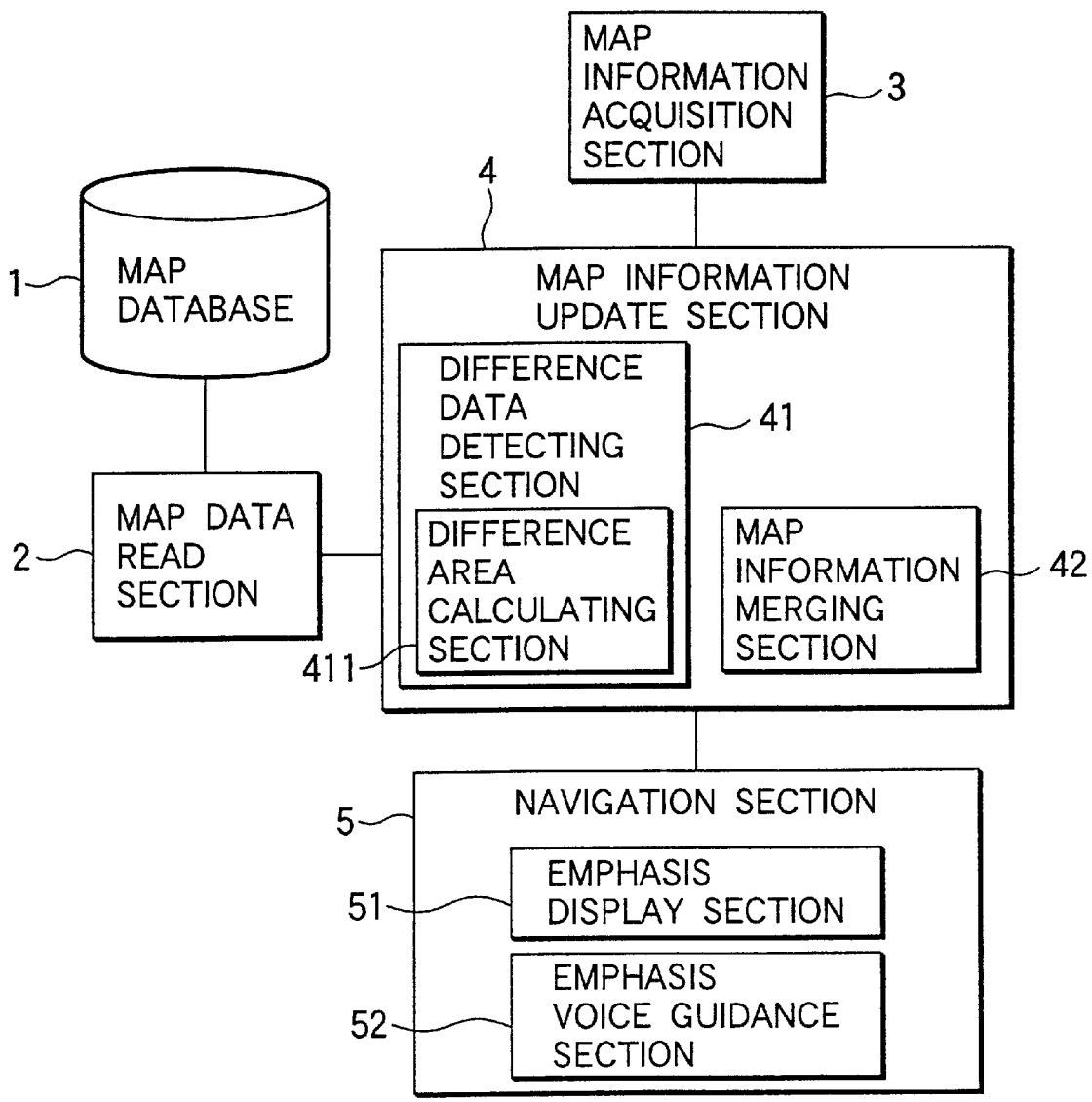
FIG. 28 is a block diagram explaining the configuration of a navigation apparatus according to Twenty-sixth embodiment of the invention.

FIG. 28 is a block diagram explaining the configuration of a navigation apparatus according to Twenty-sixth embodiment of the invention. In the figure, components having the same signs as those in FIG. 1 are identical or equivalent components.

When difference data is detected by the difference data detecting section 41, a difference area calculating section 411 calculates the range indicated by the map data and retains the range as difference area information (not shown).

In case, when map data read by the map data read section 2 or map data obtained by merging map data read by the map data read section 2 and map information acquired by the map information acquisition section 3 are sent from the map information update section 4 to the 5, the map data includes an area indicated by difference area information in the lower-layer map data, the emphasis display section 51 notifies on the display that the lower layer of the displayed map contains an area where difference data is present.

Figure 29:
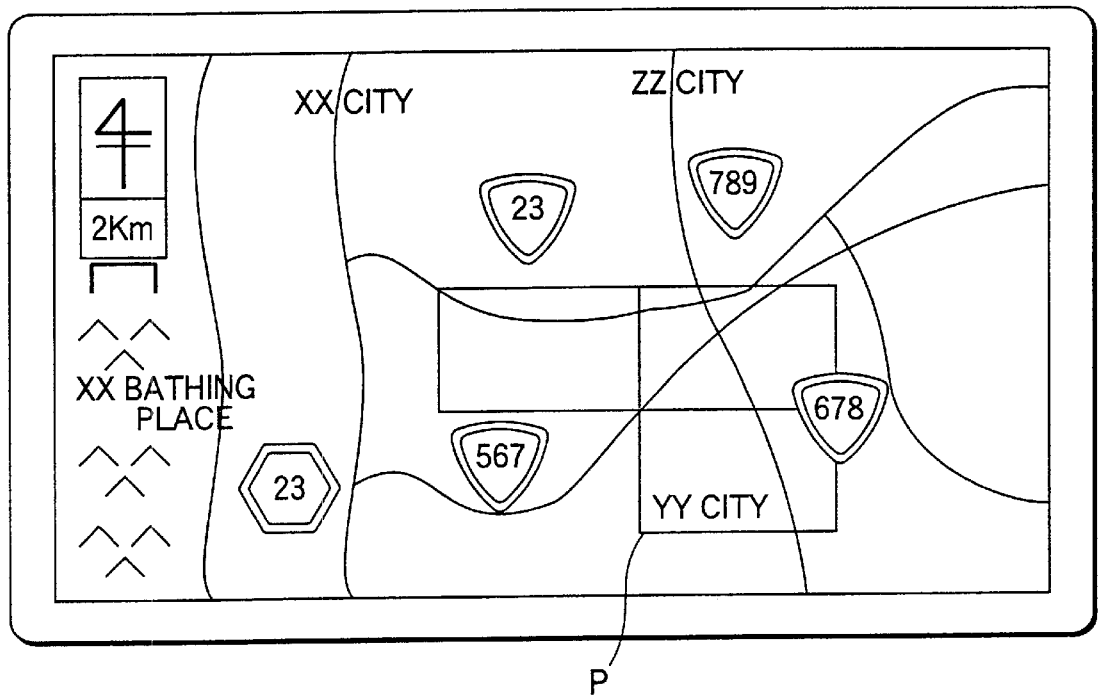
FIG. 29 is a block diagram explaining the operation of the navigation apparatus according to Twenty-sixth embodiment of the invention.

FIG. 29 is a block diagram explaining the operation of navigation apparatus according to Twenty-sixth embodiment of the invention. FIG. 28 is an example that uses a rectangle such as P to show that the lower layer contains an area where difference data is present.

According to the navigation apparatus of the first aspect of the invention, it is possible to specify to the user the modifications to the information related to the map by presenting data corresponding to the updated map-related information via a method that is different from an ordinary display or voice guidance, and the user can properly make decision based on the map information by recognizing the modifications.

According to the navigation apparatus of the second aspect of the invention, it is possible to present in advance the updated map-related information to be acquired, and the user can specify the target data thus allowing operation tailored to the user's needs as well as reducing the data volume of information to be acquired from outside.

According to the navigation apparatus of the third aspect of the invention, the user specifies the type of the latest target information in advance so that it is possible to eliminate the bother of presenting map-related information step by step for user selection thus relieving the user of unnecessary actions while the user is operating the navigation apparatus.

According to the navigation apparatus of the fourth aspect of the invention, in case map data is requested in a route search, specification of target map information by the user is canceled and all the latest information contained in the area necessary for the route search is acquired. Thus, the route obtained by the navigation apparatus and map information on the close vicinity of the route match the real scenery in front of the user.

According to the navigation apparatus of the fifth aspect of the invention, the emphasis management section controls the timing and level of emphasis so that it is possible to provide emphasis display or emphasis voice guidance tailored to the user's needs.

According to the navigation apparatus of the sixth aspect of the invention, the user can specify the items to be emphasized. The user need not input his/her needs each time any item is to be emphasized. This allows emphasis display or emphasis voice guidance that is tailored to the user's needs and relieves the user of unnecessary actions.

According to the navigation apparatus of the seventh aspect of the invention, the detail level of the contents under emphasis display or emphasis voice guidance in accordance with the usage frequency of a map. Thus, the more often the user visits an area, the more detailed information on the change in situation the user acquires. This prevents the user from making an erroneous judgment based on an assumption.

According to the navigation apparatus of the eighth aspect of the invention, prior notice guidance is given in case a period is drawing near for differential data containing period information. The user can readily keep up with a change in situation when such a change takes place.

According to the navigation apparatus of the ninth aspect of the invention, the emphasis characteristics of the user are automatically learned. Once such emphasis characteristics are learned, it is possible to provide emphasis display or emphasis voice guidance tailored to the user's needs without input from the user. This reduces the user's bother of inputting his/her emphasis characteristics while using the navigation apparatus.

According to the navigation apparatus of the tenth aspect of the invention, when difference data is acquired anew in the same map area, the emphasis level of the existing difference data is changed. This reduces the user's confusion on the freshness of individual difference data.

According to the navigation apparatus of the eleventh aspect of the invention, while the map data of an upper layer is presented on the display, difference data in the map data of a lower layer is displayed. Thus the user is let to know in advance whether difference data is acquired from outside when switching the display from the upper layer to the lower layer.

What is claimed is:

1. A navigation apparatus comprising:
   a map database that records map data in a fixed storage medium;
   a map data read section for reading the map data from the map database;
   a navigation section for detecting the location of a local apparatus, calculating a route to a destination specified by a user, and giving guidance to the destination according to the route;
   a map information acquisition section for acquiring map information from outside the navigation apparatus;
   a map information update section for updating the map database with the map information acquired by the map information acquisition section, wherein the map information update section comprises a difference data detecting section for detecting modified data as the difference between the map data read by the map data read section and the map information acquired by the map information acquisition section;
   a map information merging section for merging map data read by the map data read section and map information acquired by the map information acquisition section to generate updated map data, wherein the navigation section comprises an emphasis display section for displaying the modified data detected in the difference data detecting section in an emphasized way such that displayed map data read by the map data read section is distinguishable from displayed map information acquired by the map information acquisition section; and
   an emphasis voice guidance section providing emphasized guidance of the modified data detected in the difference data detecting section.

2. The navigation apparatus according to claim 1, wherein the map information acquisition section comprises:
   an acquirable information presenting section for presenting to the user acquirable map information that is acquirable from outside the navigation apparatus; and
   a target information selecting section for selecting target map information from the acquirable map information presented to the user.

3. The navigation apparatus according to claim 1, wherein the map information acquisition section comprises a target information specification section for specifying target map information to be acquired from outside the navigation apparatus.

4. The navigation apparatus according to claim 1, wherein the map information acquisition section comprises a target information unspecification section for canceling a user specification in order to limit target information to a geographical area necessary for a route search and maintaining the specification canceled by the user when information on the geographical area for which the specification has been canceled is subsequently acquired.

5. The navigation apparatus according to claim 1, further comprising an emphasis management section for managing emphasis display and emphasis voice guidance, comprising:
   an emphasis start determination section for determining timing of starting of at least one of emphasis display and emphasis voice guidance;
   an emphasis display end determination section for determining timing of ending of emphasis display; and
   an emphasis display level determination section for determining emphasis level of each item to be displayed emphatically.

6. The navigation apparatus according to claim 1, further comprising an emphasis management section for managing emphasis display and emphasis voice guidance comprising an emphasis unit determination section for determining whether to emphasize emphasis unit information including items preselected by the user and data corresponding to the emphasis unit information.

7. The navigation apparatus according to claim 1, further comprising an emphasis management section for managing emphasis, wherein
   the navigation section comprises a map data usage characteristics learning section for learning map data usage characteristics of the user, and
   the emphasis management section comprises an emphasis detail level determination section for determining detail level of contents to be displayed emphatically or to undergo emphasis voice guidance in accordance with the map data usage characteristics learned by the map data usage characteristics learning section.

8. The navigation apparatus according to claim 1, further comprising an emphasis management section for managing emphasis, wherein the emphasis management section comprises a period information detecting section for detecting period information when period information is included in the difference data detected in the difference data detecting section and including a period emphasis instructing section for instructing the emphasis display section or the emphasis voice guidance section to provide period emphasis according to the period described in the period information detected by the period information detecting section.

9. The navigation apparatus according to claim 1, comprising an emphasis management section for managing emphasis comprising an emphasis characteristics learning section for learning emphasis characteristics of the user.

10. The navigation apparatus according to claim 1, wherein the emphasis display section, recognizing an item to be displayed emphatically, emphasizes the item in a way different from emphasis of items currently displayed emphatically.

11. The navigation apparatus according to claim 1, wherein
    the difference data detecting section comprises a difference area calculating section for calculating a geographical area where difference data is present and the emphasis display section shows that difference data is present in lower-layer map data when the geographical area is in the lower-layer map data of the map data displayed.

12. A navigation apparatus comprising:

a map database that records map data in a fixed storage medium;

a map data read section for reading the map data from the map database;

a navigation section for detecting the location of a local apparatus, calculating a route to a destination specified by a user, and giving guidance to the destination according to the route;

a map information acquisition section for acquiring map information from outside the navigation apparatus;

a map information update section for updating the map database with the map information acquired by the map information acquisition section, wherein the map information update section comprises a difference data detecting section for detecting modified data as the difference between the map data read by the map data read section and the map information acquired by the map information acquisition section; and a map information merging section for merging map data read by the map data read section and map information acquired by the map information acquisition section to generate updated map data, wherein the navigation section comprises an emphasis display section for displaying the modified data detected in the difference data detecting section in an emphasized way such that displayed map data read by the map data read section is distinguishable from displayed map information acquired by the map information acquisition section.

13. A navigation apparatus comprising:

a map database that records map data in a fixed storage medium;

a map data read section for reading the map data from the map database;

a navigation section for detecting the location of a local apparatus, calculating a route to a destination specified by a user, and giving guidance to the destination according to the route;

a map information acquisition section for acquiring map information from outside the navigation apparatus;

a map information update section for updating the map database with the map information acquired by the map information acquisition section, wherein the map information update section comprises a difference data detecting section for detecting modified data as the difference between the map data read by the map data read section and the map information acquired by the map information acquisition section; and a map information merging section for merging map data read by the map data read section and map information acquired by the map information acquisition section to generate updated map data, wherein the navigation section comprises an emphasis voice guidance section for providing emphasized voice guidance of the modified data detected in the difference data detecting section.

* * * * *